(12) United States Patent
Blonder

(10) Patent No.: US 8,747,070 B2
(45) Date of Patent: Jun. 10, 2014

(54) SPINNING HORIZONTAL AXIS WIND TURBINE

(76) Inventor: Greg E Blonder, Summit, NJ (US)

(*) Notice: Subject to any disclaimer, the term of this patent is extended or adjusted under 35 U.S.C. 154(b) by 421 days.

(21) Appl. No.: 13/181,093

(22) Filed: Jul. 12, 2011

(65) Prior Publication Data

US 2012/0014795 A1    Jan. 19, 2012

Related U.S. Application Data

(60) Provisional application No. 61/363,691, filed on Jul. 13, 2010.

(51) Int. Cl.
  *F03D 5/00* (2006.01)
(52) U.S. Cl.
  USPC .............................................. 416/117; 416/83
(58) Field of Classification Search
  USPC .......... 415/907, 908; 416/19, 79, 117, 132 B, 416/144, DIG. 6, 80, 83, 87
  See application file for complete search history.

(56) References Cited

U.S. PATENT DOCUMENTS

| | | | | |
|---|---|---|---|---|
| 85,508 A | * | 1/1869 | Beach | 416/132 R |
| 1,256,338 A | * | 2/1918 | Liles | 416/110 |
| 4,423,333 A | * | 12/1983 | Rossman | 290/44 |
| 4,522,600 A | * | 6/1985 | Jost | 440/8 |
| 4,561,826 A | * | 12/1985 | Taylor | 416/19 |
| 4,619,583 A | * | 10/1986 | Wikstrom | 416/122 |
| 4,624,623 A | * | 11/1986 | Wagner | 416/19 |

FOREIGN PATENT DOCUMENTS

| FR | 2574863 | * | 6/1986 |
|---|---|---|---|
| GB | 2234298 | * | 1/1991 |

OTHER PUBLICATIONS

Berger, Single-blade rotor wind generator which may be coupled to a static device for capturing solar energy, Jun. 20, 1986, Abstract of FR 2574863.*
Video titled "Bio-Inspired Wind Turbine Flapping It's Wings"; http://www.youtube.com/watch?v=kWMuFnxk1o8&feature=player_embedded; posted on Oct. 27, 2009.

* cited by examiner

*Primary Examiner* — Ned Landrum
*Assistant Examiner* — Liam McDowell
(74) *Attorney, Agent, or Firm* — Lowenstein Sandler LLP

(57) ABSTRACT

A spinning horizontal axis wind turbine is disclosed. The blades of the wind turbine are configured to allow the blades to simultaneously rotate in a vertical axis and a horizontal axis when acted upon by an external force such as a wind current. The tip of each blade travels along a helical "figure 8" pattern as the blade rotates through a complete cycle, moving from nearly vertical to nearly horizontal in a complete cycle.

18 Claims, 27 Drawing Sheets

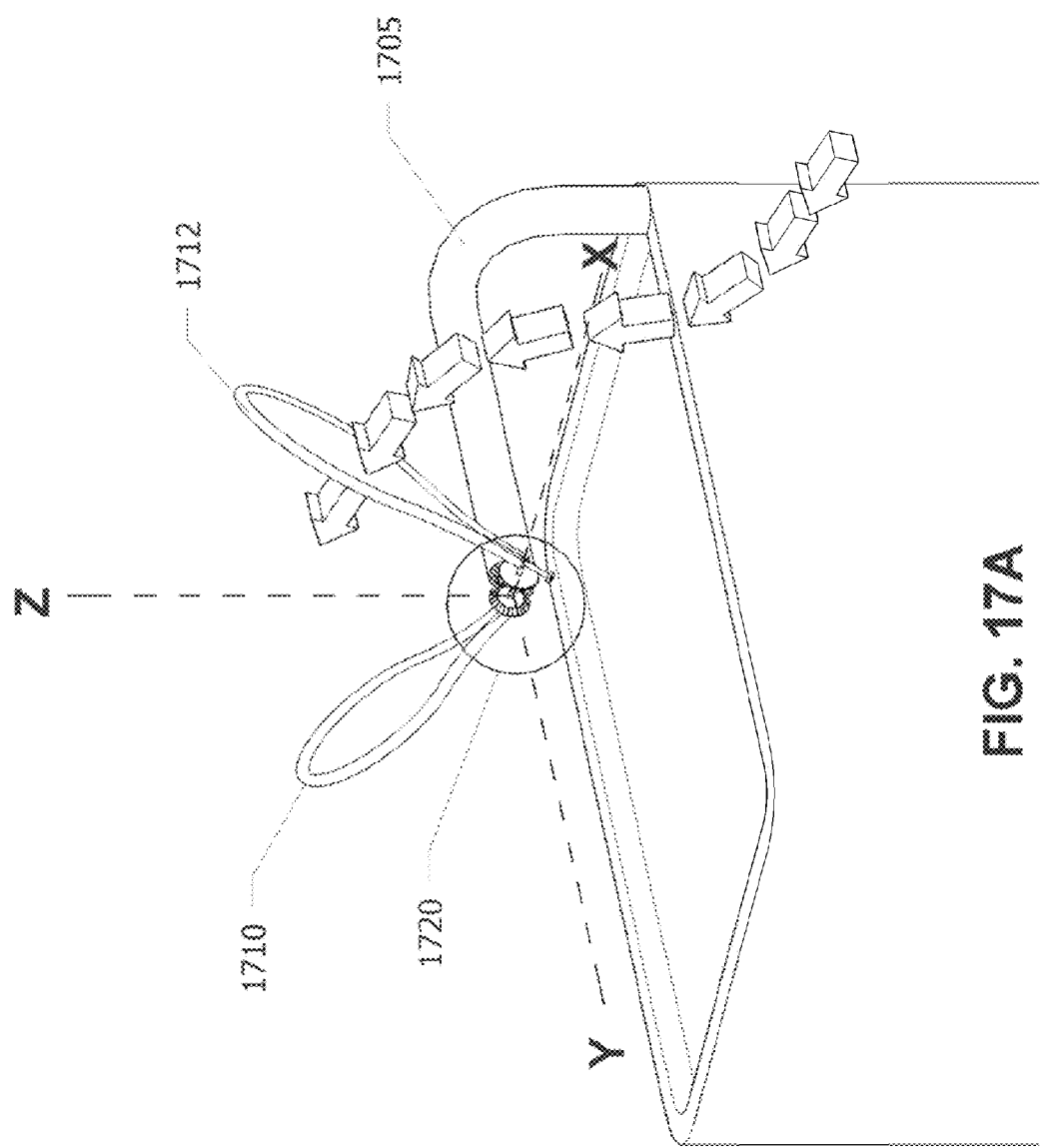

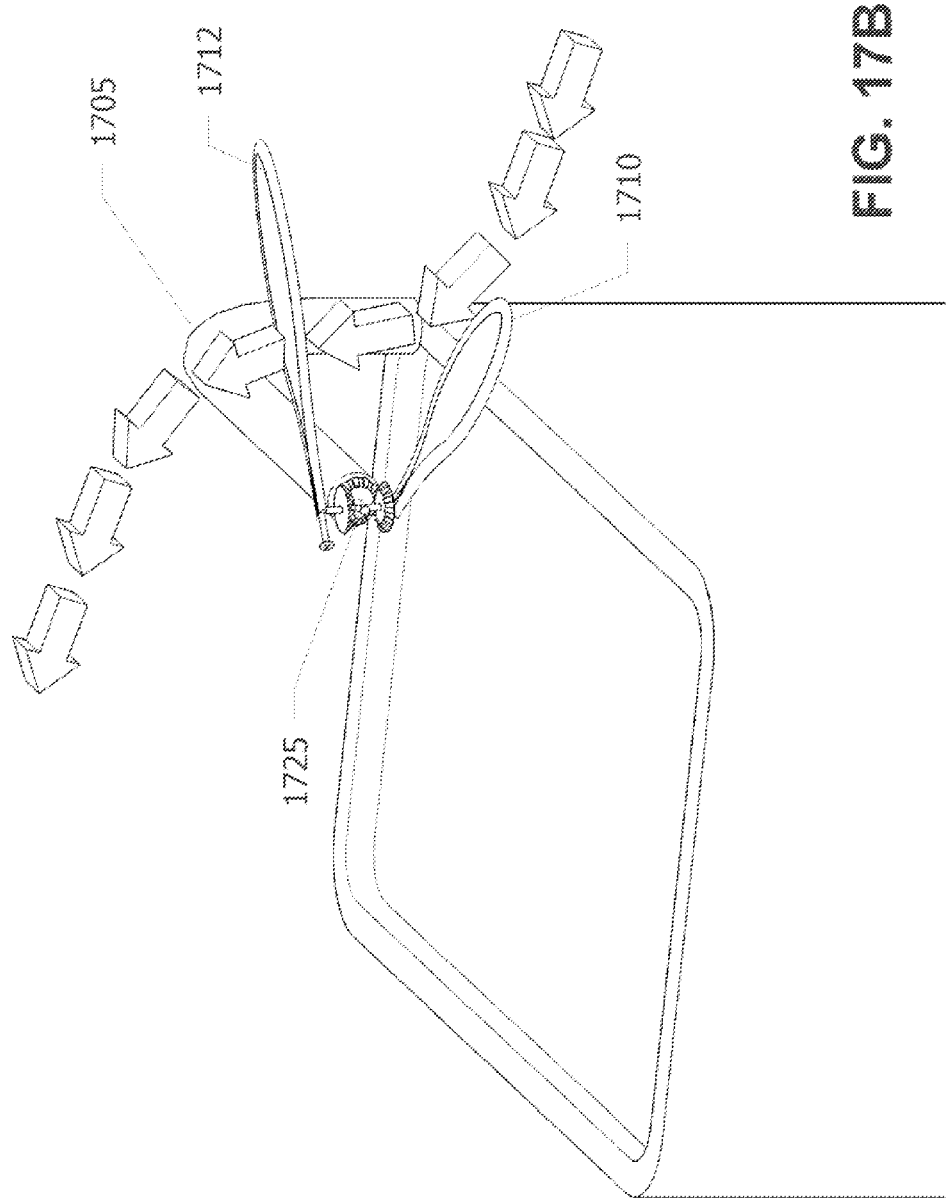

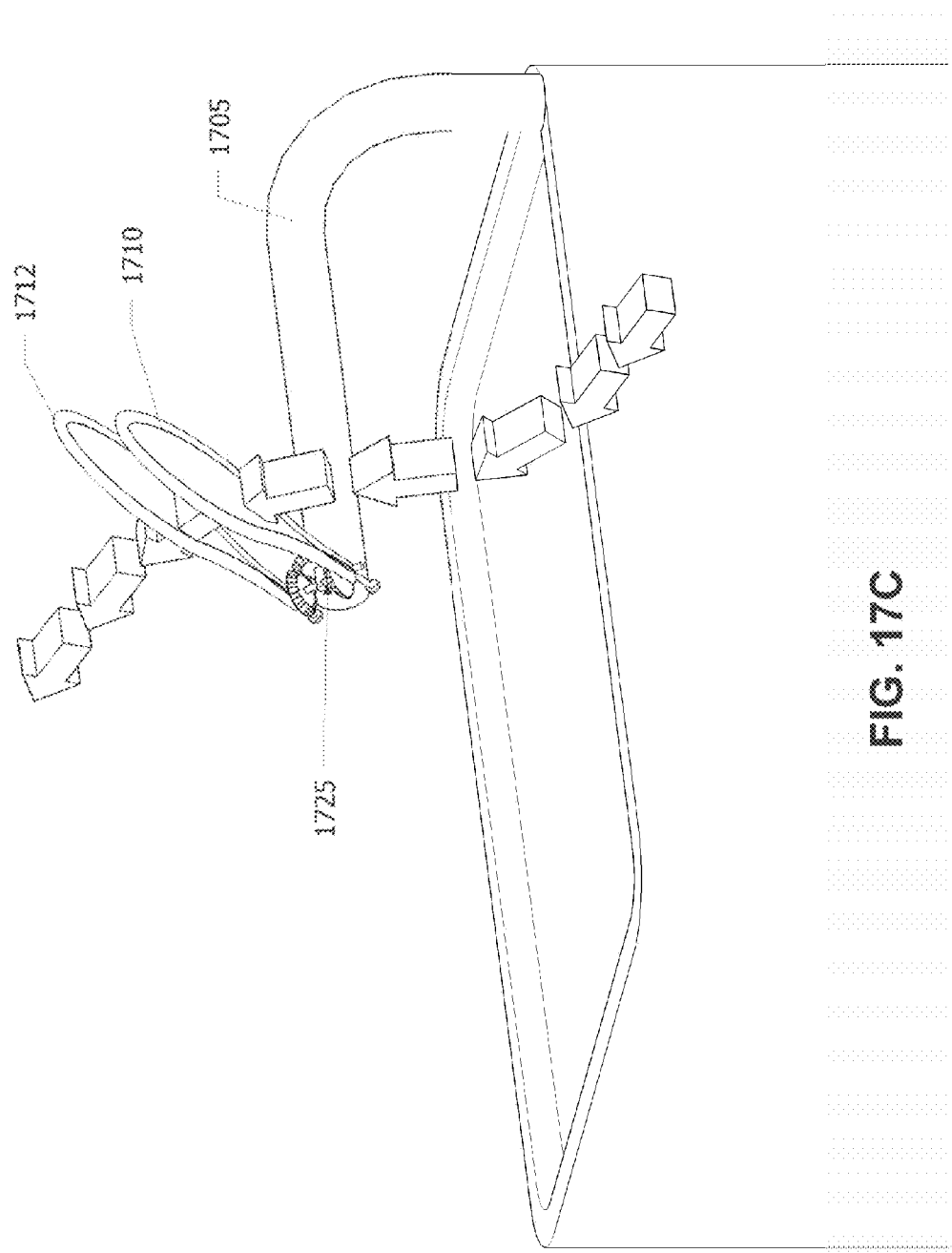

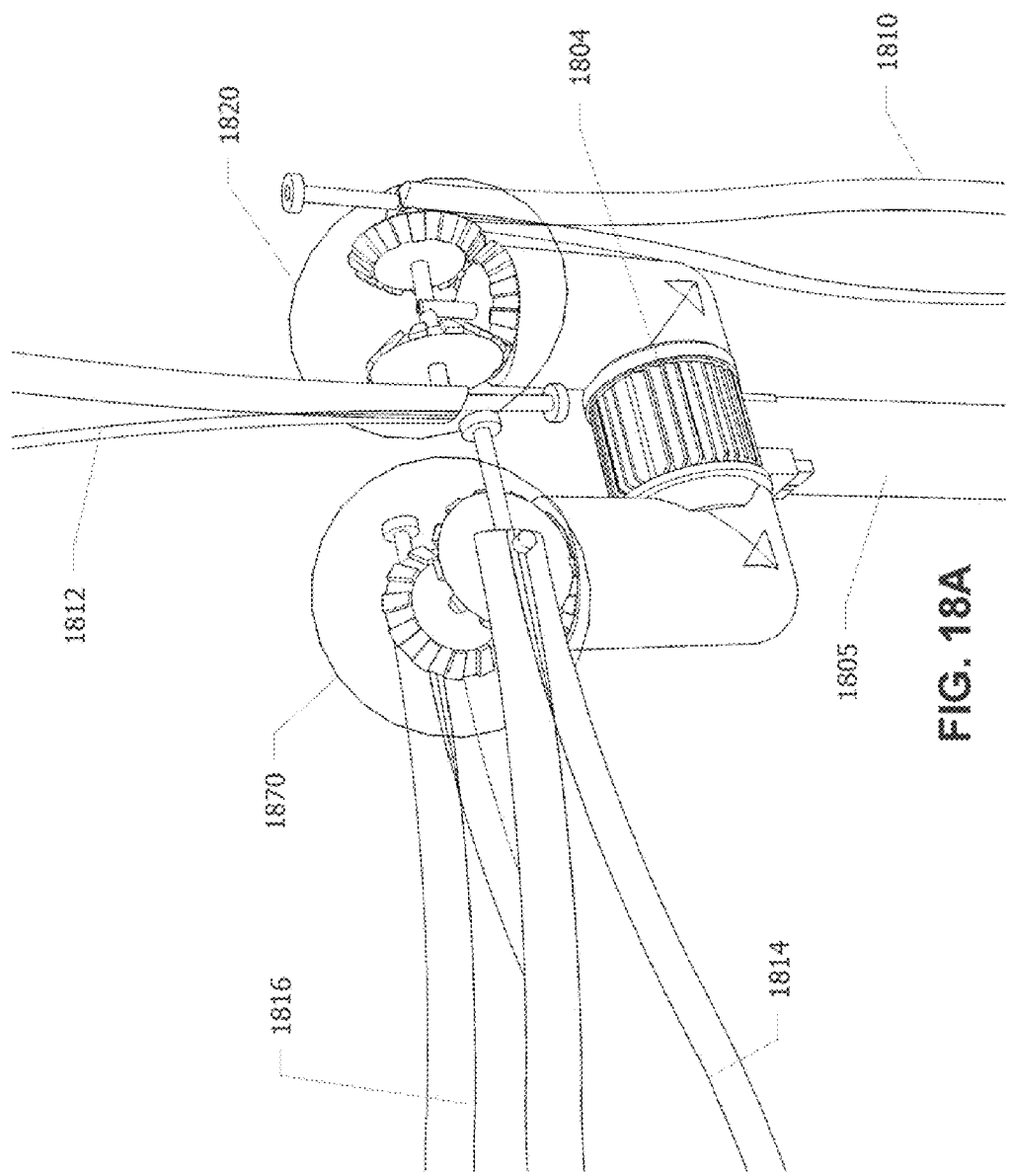

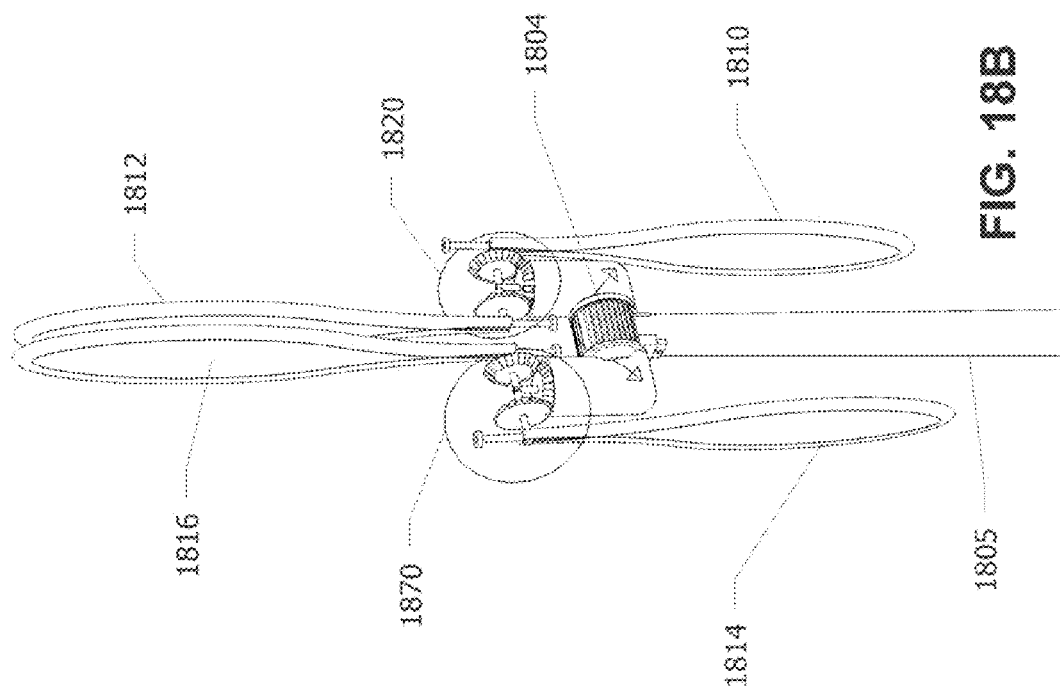

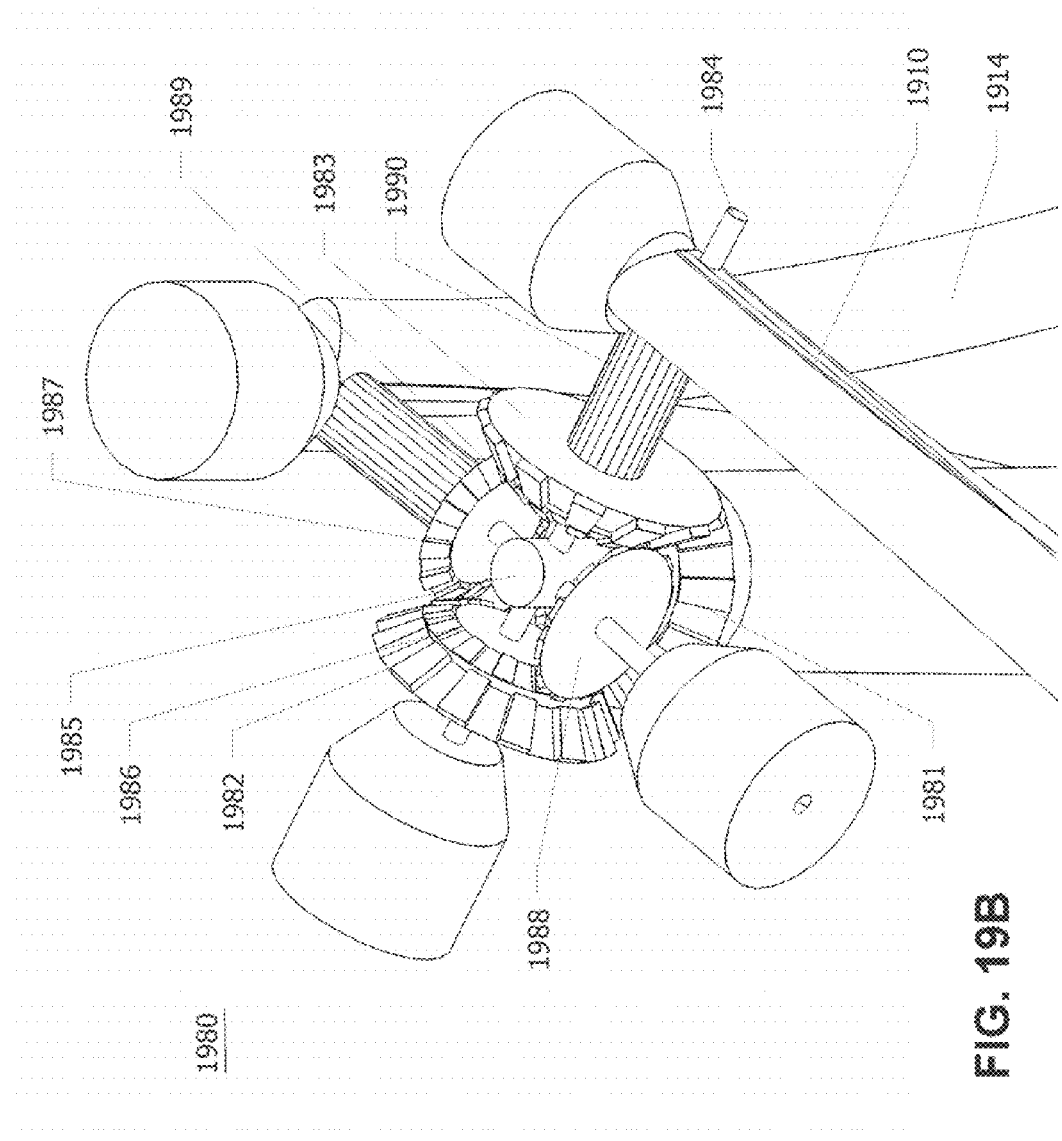

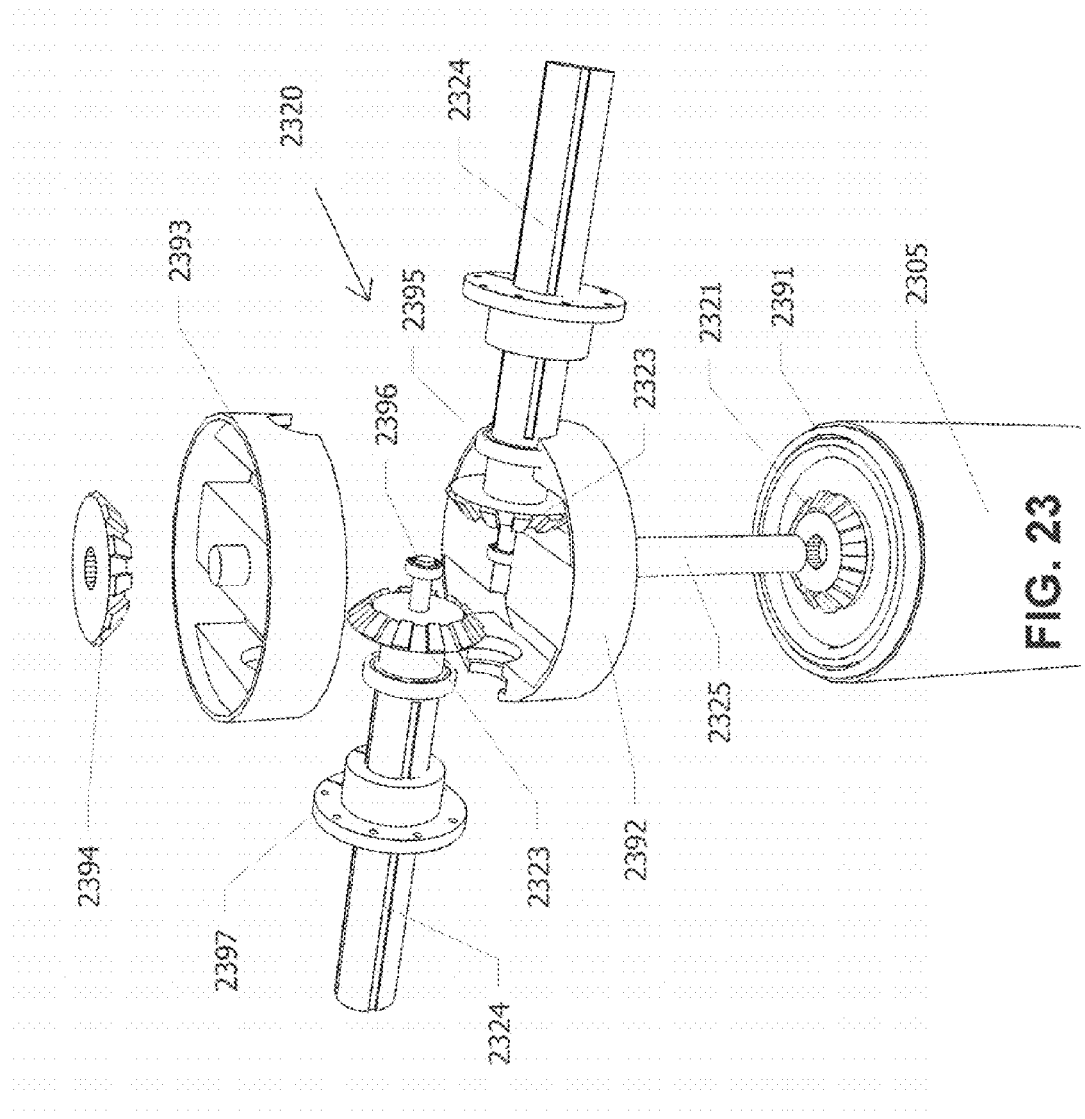

SPINNING HORIZONTAL AXIS WIND TURBINE

REFERENCE TO PRIORITY APPLICATION

This application claims priority to U.S. Provisional Patent Application No. 61/363,691, filed on Jul. 13, 2010, titled "SPINNING HORIZONTAL AXIS WIND TURBINE," the entire disclosure of which is incorporated herein by reference.

TECHNICAL FIELD

The present invention relates generally to wind turbines, and more specifically, to spinning horizontal axis wind turbines.

BACKGROUND

Wind turbines, particularly megawatt capacity and above, offer high energy efficiency while providing "green" electricity at prices comparable to fossil fuel sources. Large windmills dominate the physical landscape because of two fundamental characteristics. First, the available energy in a wind stream scales like the turbine diameter squared. That is, a 6 meter turbine gathers four times more energy than a 3 meter turbine. Second, the available energy scales like the wind velocity cubed. Mathematically, the theoretical highest efficiency a wind turbine can achieve is the "Betz" limit of 59.3%. This means that no more than 59.3% of the kinetic energy in wind currents can be converted into work. Highly optimized megawatt wind turbines can achieve overall efficiencies of nearly 40%.

There are typically four kinds of wind turbines that incorporate some permutation of the following features: vertical or horizontal rotational axis and drag or lift style blades. Large wind turbines are almost exclusively lift-type horizontal axis wind turbines or "LHAWTs." While a few single-blade LHAWTs are in use, three-bladed wind turbines are most common and have the form shown in FIG. 1. Although the three blades shown in FIG. 1 add complexity and expense compared to single or double blade types, three blades reduce vibration and speeds to acceptable levels for coupling to a generator which is often mounted in the rectangular nacelle 101 behind the tower.

The blade tips in a typical LHAWT rotate 3 to 10 times faster than the prevailing wind speed so as to extract as much energy as possible during each rotation. If the blades did not spin quickly, most of the air would pass untouched through the large open spaces between the narrow blades, thereby decreasing the turbine's efficiency. The blades are essentially a wing flying through the air, converting linear wind forces to rotary torque through a combination of momentum transfer and Bernoulli pressure differences.

The blades on a typical LHAWT are mounted radially on a central hub, greatly reducing the cost, drag and complexity of additional support structures. Each blade's angle of attack to the wind can be adjusted for optimal efficiency, or to stow the blades in high winds. Notwithstanding, LHAWT designs suffer from a number of deficiencies. Because LHAWT blades rely on lift, they do not operate at low wind velocities (like a plane, they must achieve "take off" speeds before flying). In addition, if the blades become dirty or covered with ice, the lift is dramatically reduced thus decreasing the LHAWT's efficiency. Further, the horizontal blade axle, by rotating in the XZ plane as shown in FIG. 1, must be directly aimed into the wind for highest efficiency and to avoid destructive buffeting.

An alternative approach to the LHAWT is the drag vertical axis wind turbine or "DVAWT," most notably the Savonius design named after Sigurd J. Savonius. The Savonius turbine as shown in FIG. 2 consists of two or more blades arranged around a vertical axis (denoted as the Y axis in FIG. 2). One side of each blade is scoop-shaped, and the other rounded, though neither side of the blade is particularly aerodynamic. This scooped blade design results in a drag differential between each side of the blade which causes the structure to rotate when placed in a wind current.

If both surfaces of the blade offered equal drag coefficients, the turbine would not rotate because the torques on either side of the tower would balance out. However, in the case of a Savonius wind turbine, the three "scoops" are pulled along by the wind (counter clockwise for the above turbine as indicated by the circular arrow in FIG. 2) because the smoother blade side offers slightly lower air resistance than the scoop side. Efforts have been made to increase the drag difference, mostly by changing the angle of attack of the upstream blade through a series of levers. One disadvantage is that these complex devices are easily damaged in high winds, and the blade adjustment structures themselves add to drag, thereby reducing overall efficiency.

DVAWTs do offer significant advantages over LHAWTs. First, DVAWTs do not have to be aimed into the wind, which is of particular advantage in blustery areas like rooftops or near the ground. Second, DVAWTs start rotating at lower wind speeds than LHAWTs. Third, since the blades are not aerodynamic, dirt, ice and insect gunk are less of a concern. Fourth, DVAWTs rotate essentially at the same speed as the wind, and so tend to be quieter than LHAWTs (whose tips may exceed 0.3 Mach under some conditions).

On the other hand, DVAWTs tend to be a third or less efficient than LHAWTs (perhaps 10% absolute efficiency). The DVAWT's lower overall efficiency is partly due to turbulent losses on the scoops and associated bearings. Also, it is very hard to achieve a large drag differential between the two sides of the blades when all drag sources, including blade support beams and the central axis, are included. Additionally, the lower efficiency is a consequence of 360 degree wind tolerance—meaning that some portion of each blade is always facing away from the wind in a less than optimal direction, ready to catch a change in the wind. DVAWTs are also very difficult to scale to larger dimensions, because the large blades are heavy and require disproportionately stiff supports and foundations.

The remaining two conventional designs include a lift-based vertical axis turbine (LVAWT), often called a "giromill" such as the helical giro shown in FIG. 3. LVAWTs rotate around the vertical (e.g. "Y" axis) shown by the curved arrow in FIG. 3. The helical blades on a typical LVAWT are wing-shaped in cross-section. Like LHAWTs, LVAWT blades spin quickly and do not start rotating in light winds, and like DVAWTs, the blades do not have to be aimed into the wind. But the fragile blade support cage of LVAWTs is hard to scale to large dimensions. Also, one blade is always behind the tower and is thus buffeted by turbulence.

Because LVAWTs do not begin rotating at low wind speeds, a small Savonius windmill is sometimes mounted on the same vertical axis, inside the helix. The Savonius helps start the giromill at lower wind speeds, but at the cost of additional drag and turbulence. LVAWTs can typically achieve 20% efficiency and are popular designs for urban or rooftop installations and are capable of generating a few kilowatts of power in strong winds.

The fourth approach is the drag horizontal axis wind turbine or "DHAWT." DHAWTs are characterized by vertical blades with a horizontal axle that swings around the horizontal plane (the XZ plane as shown in FIG. 4) to follow the wind. The blades on a DHAWT are flat and non-aerodynamic so as to create enough drag to turn the blades. The large number of blades efficiently intercepts the wind, even at low speeds, but as a consequence turns very slowly, and the blades have to be stowed away from damage in medium strength winds. DHAWTs are typically not used for power generation but are predominately intended to directly power water pumps.

SUMMARY OF THE INVENTION

The above-described problems are addressed and a technical solution is achieved in the art by the spinning horizontal axis wind turbine described herein. According to one or more embodiment of the present invention a wind turbine is described which comprises a mast; one or more turbine blades connected to an end of the mast wherein such turbine blades are configured to simultaneously rotate about a vertical axis of the mast and a horizontal axis of the mast when acted on by an external force. In some embodiments, the one or more turbine blades are configured such that during one-half of a full cycle around the vertical axis, a surface of the one or more turbine blades is approximately perpendicular to the external force during a quarter of the full cycle, then approximately parallel to the external force during a subsequent quarter of the full cycle.

In another embodiment, the wind turbine comprises a mast; a gear connected to an end of the mast; a drive shaft connected through the mast gear, wherein the drive shaft is configured to rotate about an axis of the drive shaft; at least one blade axle connected to an end of the drive shaft, wherein the blade axle is configured to rotate about an axis of the blade axle that is perpendicular to the drive shaft axis; at least one blade gear connected to an end of the such blade axle, wherein the blade gear is configured to engage the mast gear and at least one turbine blade connected to such blade gear that is configured to simultaneously rotate about the drive shaft axis and the blade axle axis when acted on by an external force.

In another embodiment, the wind turbine comprises a mast; a gear box connected to an end of the mast; a drive shaft connected to the gear box, wherein the drive shaft is configured to transmit power from the blades via the gear box to perform work; at least one blade axle connected to the gear box, wherein the blade axle is configured to rotate about a blade axle axis that is perpendicular to a drive shaft axis and at least one turbine blade connected to the at least one blade axle, wherein the at least one turbine blade is acted upon by an external force, the at least one turbine blade simultaneously rotates about the blade axle and the drive shaft axis, causing a tip of the at least one blade to move in a figure eight path during a rotational cycle.

BRIEF DESCRIPTION OF THE DRAWINGS

The present invention will be more readily understood from the detailed description of exemplary embodiments presented below considered in conjunction with the attached drawings, of which:

FIG. 17A is a perspective view of a roof-mounted configuration, according to an embodiment of the present invention;

FIG. 17B is a perspective view of a roof-mounted configuration, according to an embodiment of the present invention;

FIG. 17C is a perspective view of a roof-mounted configuration, according to an embodiment of the present invention;

FIG. 18A is a perspective view of a "U" mast configuration, according to an embodiment of the present invention;

FIG. 18B is a perspective view of a "U" mast configuration, according to an embodiment of the present invention;

FIG. 19B is a perspective view of a modified gear box configuration, according to an embodiment of the present invention;

FIG. 23 is an exploded view of an alternate gearbox, according to an embodiment of the present invention.

Figure 1:
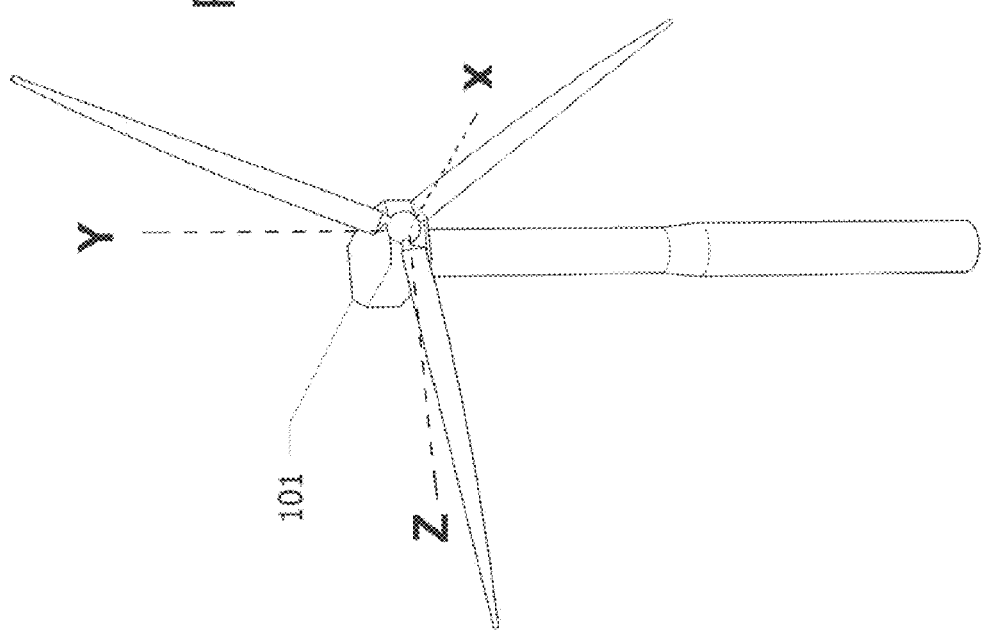
FIG. 1 is a perspective view showing a conventional lift-type horizontal axis wind turbine.
Figure 2:
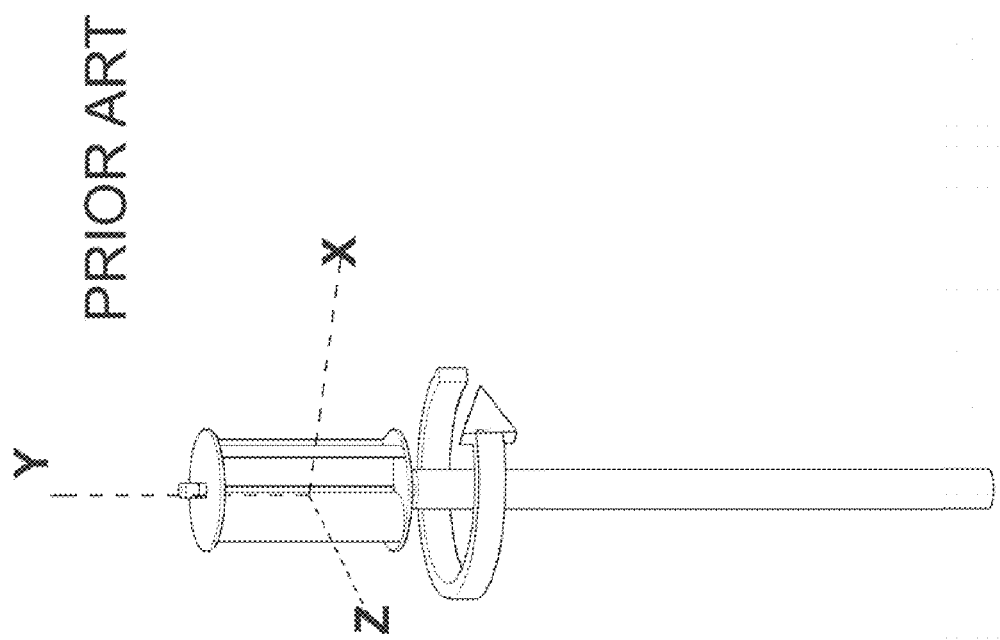
FIG. 2 is a perspective view showing a conventional drag vertical axis wind turbine.
Figure 3:
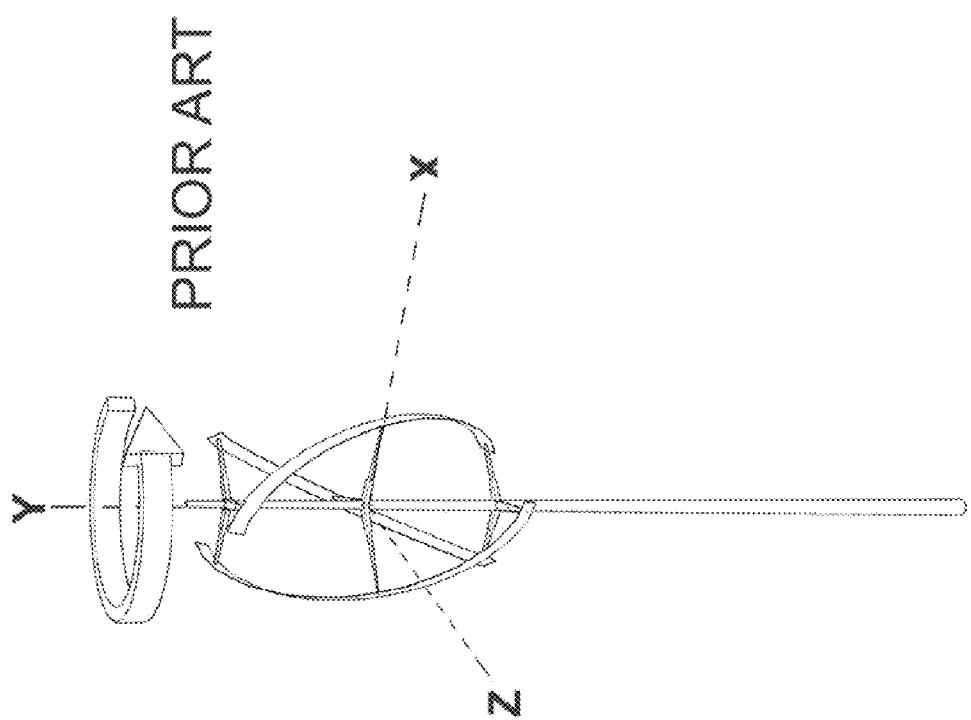
FIG. 3 is a perspective view showing a conventional lift-type vertical axis wind turbine.
Figure 4:
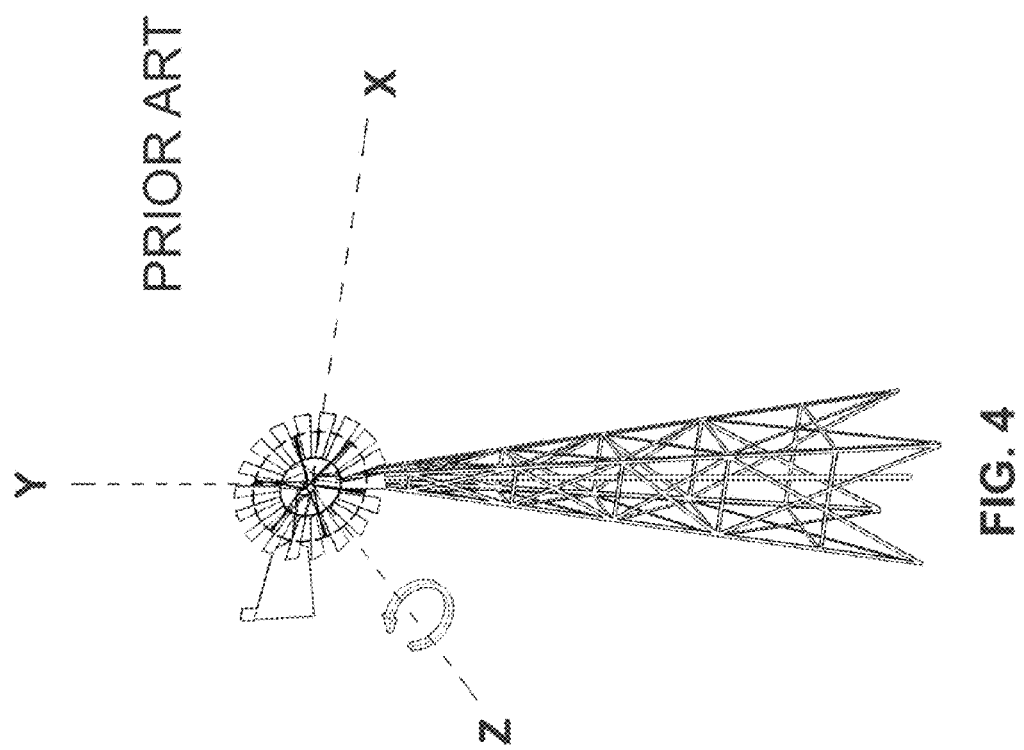
FIG. 4 is a perspective view showing a conventional drag-type horizontal axis wind turbine.

It is to be understood that the attached drawings are for purposes of illustrating the concepts of the invention and may not be to scale, and are not intended to be limiting in terms of the range of possible shapes and/or proportions. Like reference numerals refer to corresponding parts throughout the several views of the drawings.

DETAILED DESCRIPTION OF THE INVENTION

Embodiments of the present invention relate to a wind turbine comprising a radial arrangement of blades that can simultaneously rotate around a vertical axis and a horizontal axis. In one embodiment, the wind turbine is easier to support while being scalable to short and long blade lengths. In another embodiment, the wind turbine incorporates primarily drag-based geometries, such as slightly rounded blade edges and faces, that reduce turbulence when the blades move upstream and parallel to the apparent wind direction. In another embodiment, the wind turbine incorporates blades that are dust, dirt and ice tolerant and able to withstand variable wind speeds. In another embodiment, the wind turbine is able to operate in both low and high wind speed conditions thereby allowing the blades to rotate parallel to the wind and close to the support mast in extreme conditions. In another embodiment, the wind turbine is able to achieve higher efficiencies than a Savonius or similar approach while employing standard nacelle orientation techniques.

Embodiments of the present invention relate to a spinning horizontal axis wind turbine or "SHAWT." The blades of the wind turbine are connected to a gearbox that is configured to allow the blades to simultaneously rotate in a vertical axis and a horizontal axis when acted upon by an external force such as a wind current. The tip of each blade travels along a helical "figure 8" pattern as the blade rotates through a complete cycle, moving from nearly vertical to nearly horizontal in a complete cycle. Embodiments of the present invention allow for the gearbox to be connected to a support mast in a vertical or horizontal arrangement or any angle in between. The drive shaft may carry power through the gear box into the mast, or via an additional gear train, into an attached nacelle and generator. Embodiments of the present invention also allow for multiple blades to be connected to the gearbox to maximize overall efficiency of the wind turbine. The wind turbine may be used to generate electricity, drive a pump, perform other work or for decorative applications.

Figure 5:
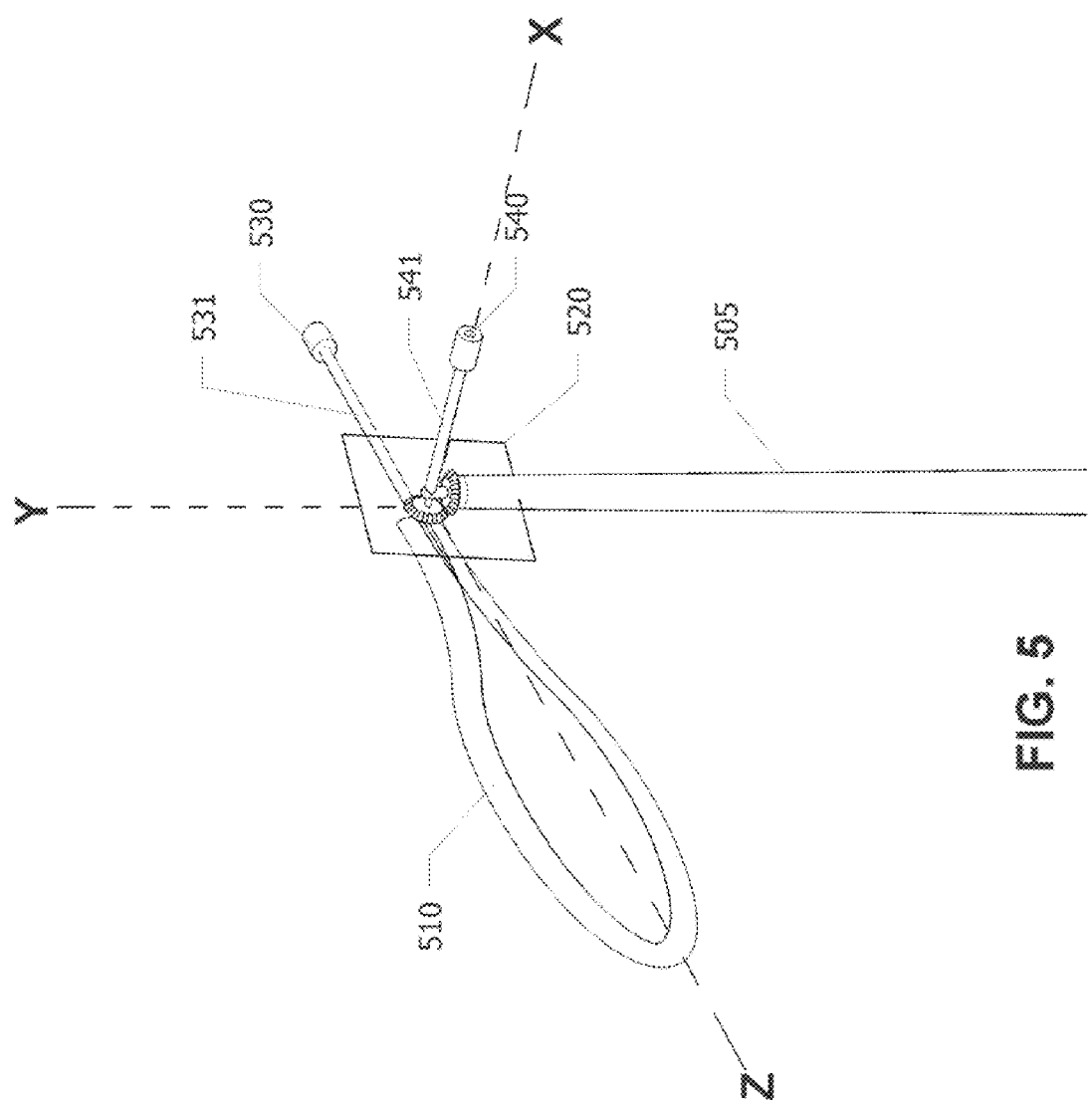
FIG. 5 is a perspective view of a single blade spinning horizontal axis wind turbine, according to an embodiment of the present invention.

Referring to FIG. 5, a wind turbine according to an embodiment of the present invention includes a single flat blade 510 counter-balanced by balance weight 530 connected to the end of a balance rod 531. The term "connected" as used herein is intended to include, but is not limited to, any suitable means or method to mount, connect, integrally connect, engage, attach, join, affix, adhere, etc. The blade 510, balance weight 530 and balance rod 531 comprise the entire blade assembly. The blade 510 is attached to a gearbox 520, and the entire blade assembly is counterbalanced across the gearbox 520 by a second counterweight 540 and a second balance rod 541. The balance rods 531 and 541 can be of variable length depending on the particular implementation. In addition, the mass of each counterweight 530 and 540 can be varied so as to reduce vibration in the system. The gearbox 520 configuration causes the blade 510 to spin simultaneously around the tower 505 axis (vertical or Y-axis rotation), while rotating around the second counterweight 540 and second balance rod 541 axis in the horizontal (XZ) plane.

The blade 510 shown in FIG. 5 is configured to operate as a drag-based coupling to the wind. According to an embodiment of the present invention, the blade 510 faces and edges may be slightly rounded, like a symmetric wing or boat paddle, to take advantage of the downstream wind during part of the rotation cycle while at the same time reducing drag in the upstream part of the cycle. One having ordinary skill in the art will appreciate that the size and shape of the blade can be varied based on the particular implementation. In addition, the blades may be constructed from a wide variety of suitable materials such as, for example, metals and polymers. One having ordinary skill in the art will appreciate that the blades will typically be constructed of materials that are both strong and lightweight.

Figure 6:
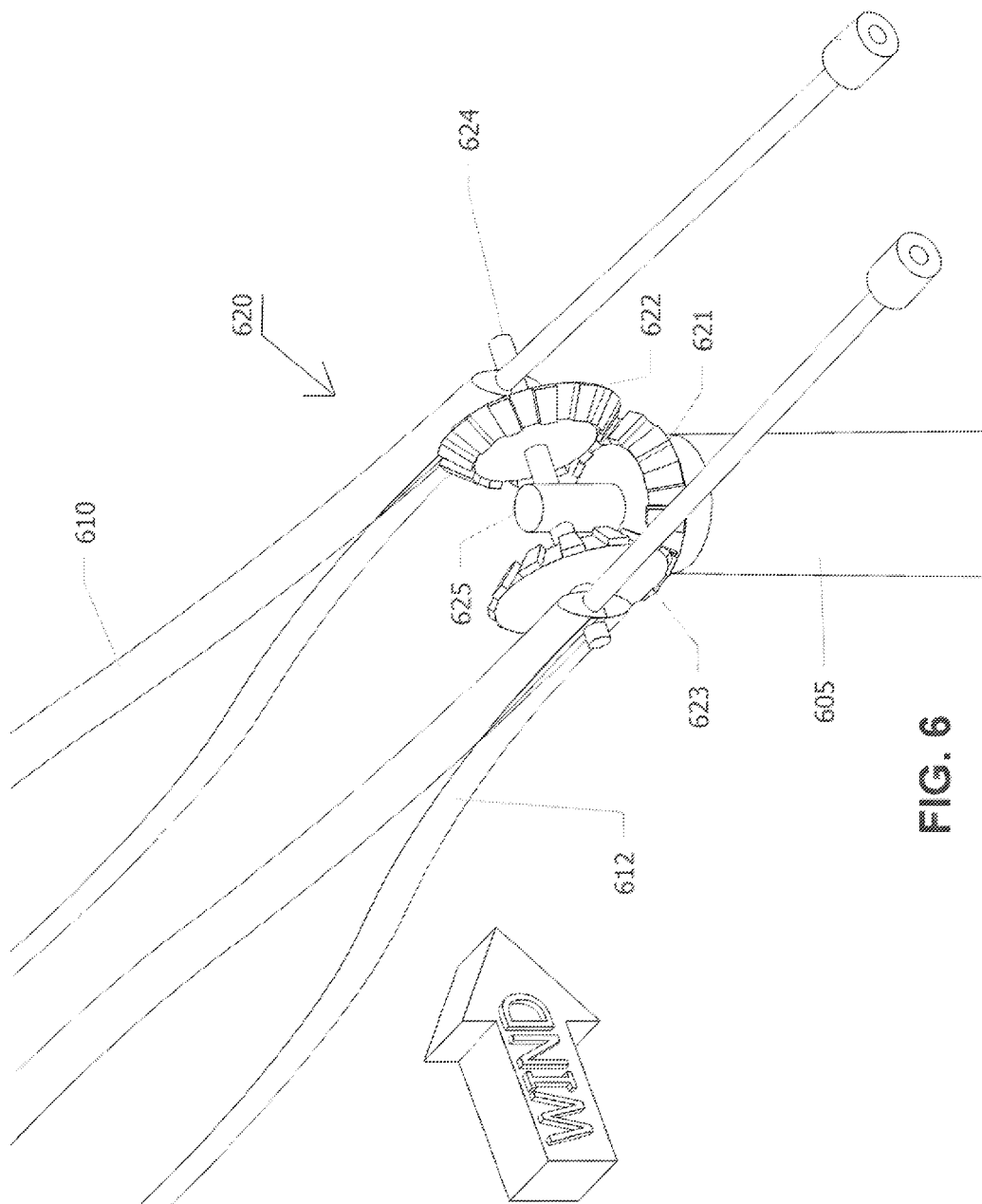
FIG. 6 is a perspective view of a gearbox, according to an embodiment of the present invention.

According to an embodiment of the present invention, the wind turbine comprises a gearbox 620 as shown in FIG. 6. The gearbox 620 is configured to simultaneously coordinate the blade 610, 612 rotation and the blade's 610, 612 angle of attack. In an embodiment, the mast gear 621 and blade gears 622, 623 are all approximately the same diameter and pitch. According to an embodiment of the present invention, mast gear 621 and blade gears 622, 623 are bevel gears, but one having ordinary skill in the art will appreciate that any suitable gear type or geometry may be used.

As shown in FIG. 6, mast gear 621 is connected to the top of the mast 605. Each blade 610, 612 is rigidly connected to its associated bevel gear 622, 623 respectively, either directly, or through a blade axle 624. A drive shaft 625 passes through the mast gear 621 on a rotary thrust bearing. The drive shaft 625 freely rotates so as to allow the blades 610, 612 to rotate around the vertical axis. Perpendicular to drive shaft 625 is a solidly connected blade axle 624, thus forming a "T" shaped rigid assembly. Blade gears 622, 623 (and their associated blades 610, 612) rotate freely on bearings slipped over the blade axle 624. Each component within the gearbox 620 may be constructed from a suitable material depending on the type of application. By way of example and not limitation, suitable metals include aluminum and steel. In addition, other materials such as polymers may be utilized. The mast 605 will typically comprise a hollow elongated cylinder and the length and diameter of the mast 605 will vary depending on the application. As with the other components of the wind turbine, the mast 605 may be constructed from a variety of suitable materials including metals and polymers.

Figure 7:
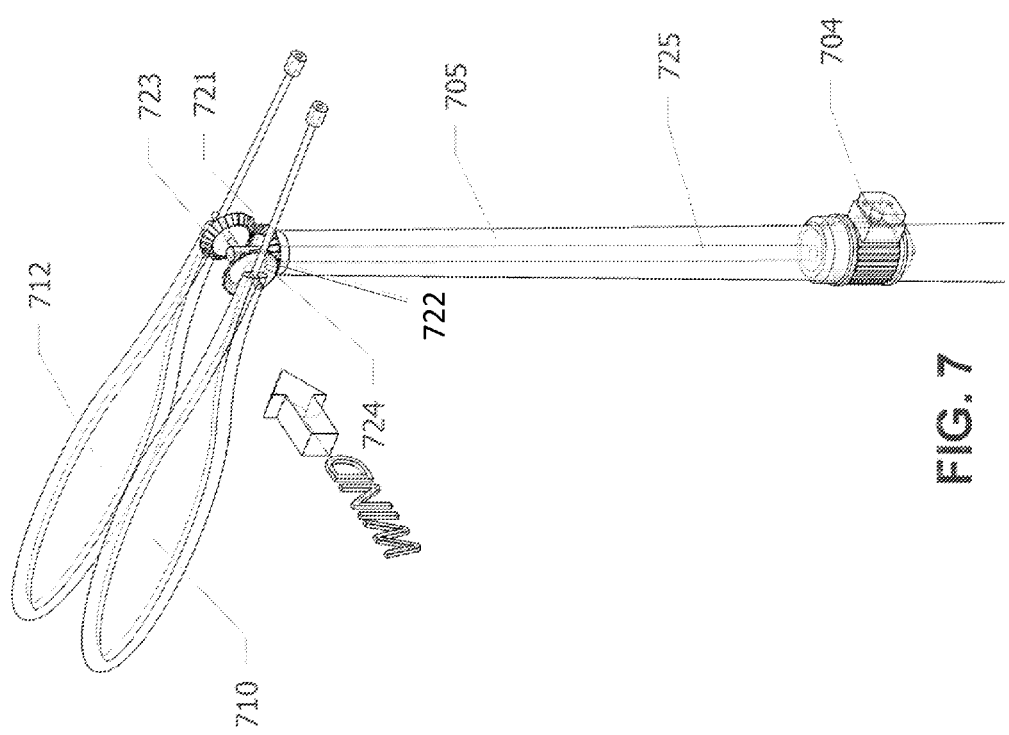
FIG. 7 is a semi-transparent perspective view of a mast showing the drive shaft attached to an electrical generator, according to an embodiment of the present invention.

According to an embodiment of the present invention, a generator 704 may be attached to the lower end of the drive shaft 725 near the bottom of the mast 705. FIG. 7 shows an internal view of the mast 705 showing the draft shaft 725 attached to a generator 704 according to an embodiment of the present invention. One having ordinary skill in the art will appreciate that the generator 704 may be replaced with a pump or other suitable device. In addition, the generator 704 may be positioned anywhere inside the mast 705.

Without the mast gear 721 and blade gears 722, 723, when the wind acts on the faces of both blades 710, 712, such force would cause the drive shaft 725 to rotate about 90 degrees until the blades 710, 712 are parallel to the wind direction (denoted by the arrow in FIG. 7). At that point, to move either clockwise or counterclockwise would create a countervailing blade pressure. In such an event, the wind turbine would stop spinning and act more like a wind vane, centered in the downstream wind direction. On the other hand, the blade gears 722, 723 force blades 710, 712 to rotate in opposite directions about the blade axle 724, while simultaneously powering and rotating the coupled drive axle 725. Thus, after a 90 degree drive shaft 725 movement, blades 710, 712 are now nearly vertical—one pointed up, the other down. If blades 710, 712 are rotated a bit further than 90 degrees, the blades 710, 712 would start moving back together, and unlike a wind vane, the wind pressure creates additional forward rotation, rather than swinging the blades 710, 712 back in the downstream direction.

Figure 8:
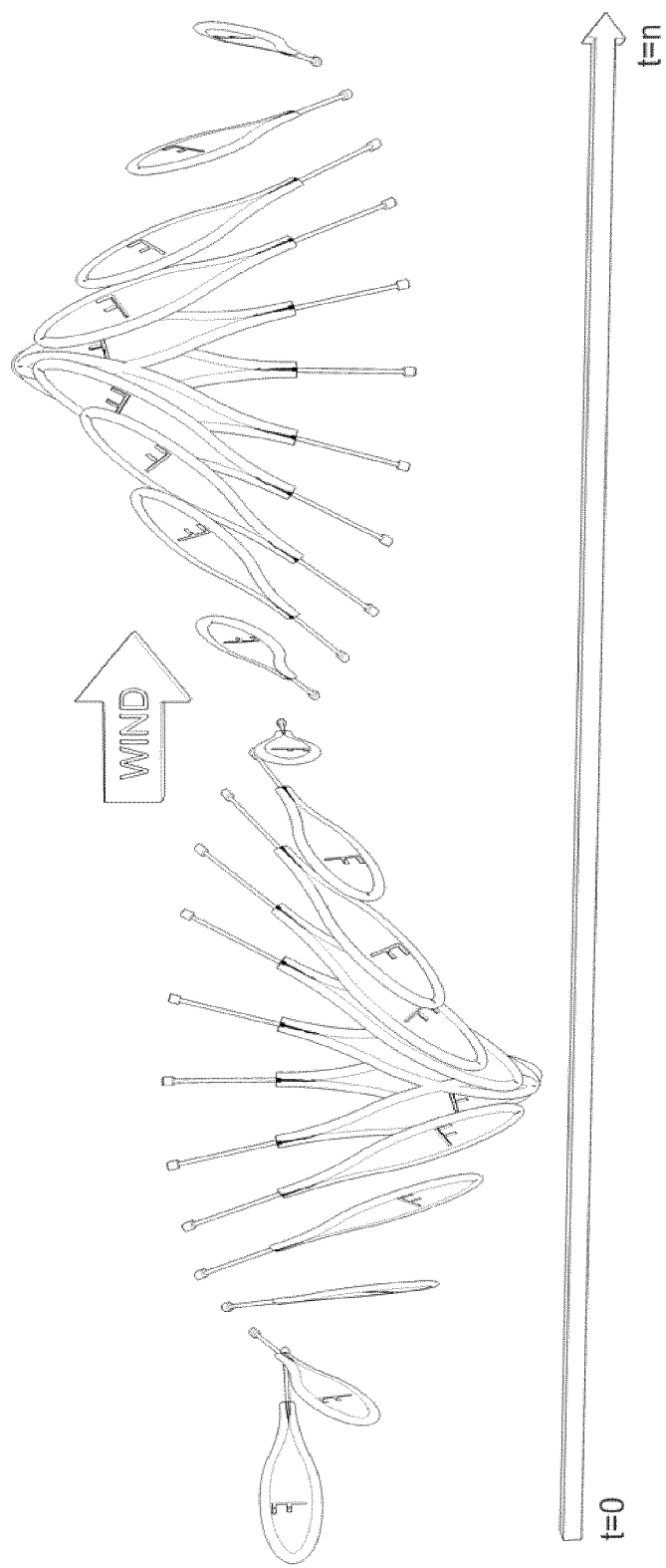
FIG. 8 is a side view of time-ordered sequence of "snapshots" as the blade moves from left to right in time, according to an embodiment of the present invention.

According to an embodiment of the present invention, each blade 710, 712 follow a helical "figure 8" pattern, as can be seen from the time-ordered sequence of blade "snapshots" shown in FIG. 8, moving from left to right in time. For purposes of clarity, the gearbox and mast are not shown in FIG. 8. Also, moving from left to right in FIG. 8 indicates increasing time as shown by the time axis. The far left side of FIG. 8 shows the blade position at time t=0 and the right side of FIG. 8 shows the blade position at some later time t=n after one complete blade revolution. Note that the blade itself is not translating from left to right. The arrow pointing to the right indicates the wind direction. To help distinguish blade orientation during a rotation cycle, the letter "F" has been embossed through the blade in this illustration. During upstream motion, the blade face is substantially parallel to the wind direction, and so experiences low drag. On downstream motion, the blade face becomes perpendicular to the wind direction. Thus the wind turbine according to an embodiment of the present invention will be more efficient and powerful than a conventional drag-type wind turbine whose blades move upstream half the time, with high drag forces. Note, for this blade with its face connected perpendicular to its axle, the embossed "F" demonstrates that the front and back blade face is exposed perpendicularly to the wind direction during half of the cycle.

Figure 9:
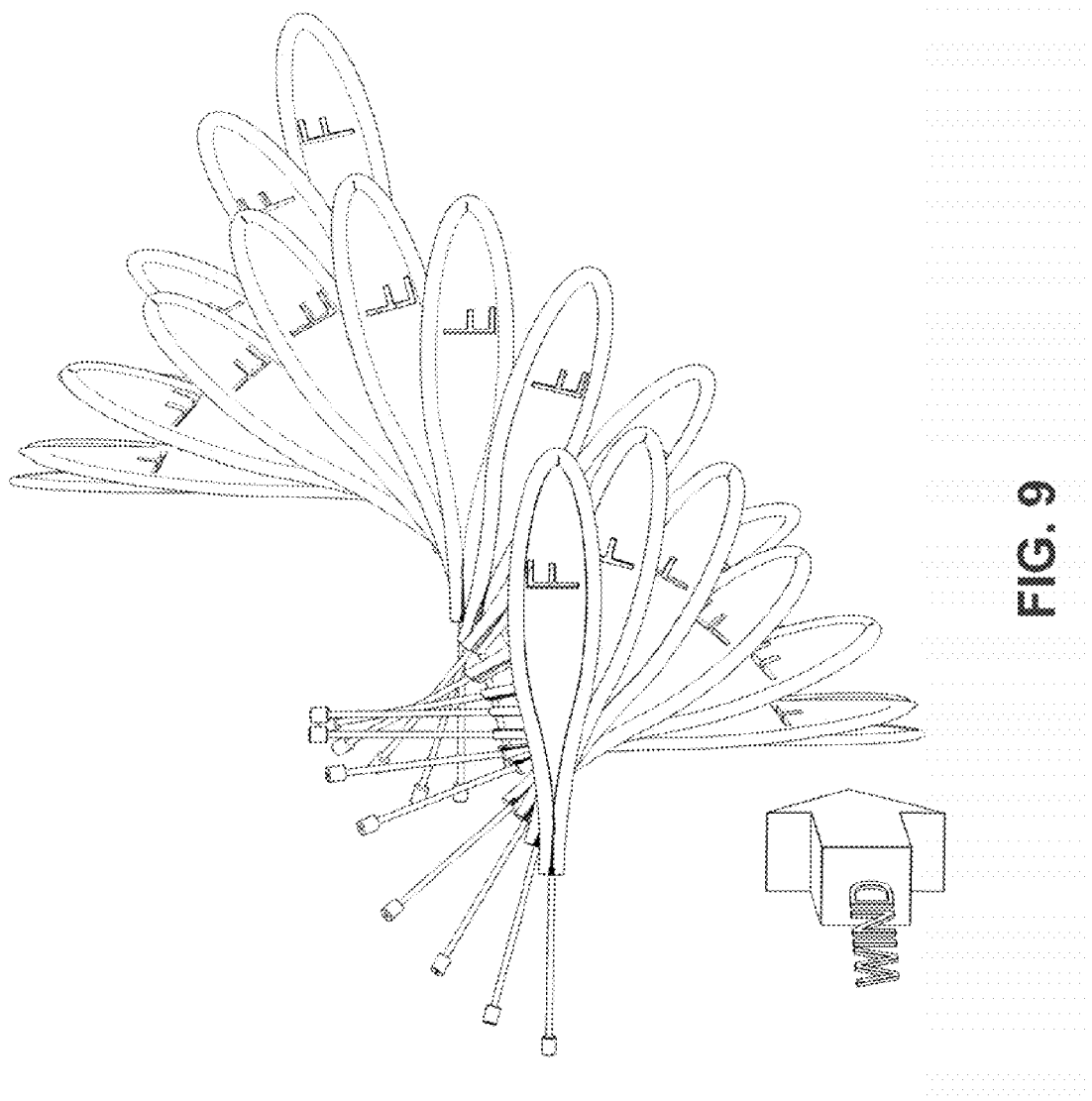
FIG. 9 is a downwind view of a time-ordered sequence of "snapshots" as the blade moves from front to back in time, according to an embodiment of the present invention.

FIG. 9 is looking downwind at a time-ordered sequence of "snapshots" as the blade moves from front to back in time. As in the case of FIG. 8, the gearbox and mast have been omitted from FIG. 9 for clarity. Also, progressing from the front to the back of the figure denotes increasing time. The embossed letter "F" show the blade orientation at each stage of rotation. When the blade moves away from the upstream wind direction, the gearbox assures that the blade is angled in such a way as to produce rotation in one consistent direction during a cycle so maximum energy is extracted from the wind. The blade's motion is reminiscent of the position of a swimmer's palm when swimming the freestyle stroke. A swimmer's palm is perpendicular to the lane during the power stroke, and then twisted parallel on the return stroke to reduce drag.

Figure 10:
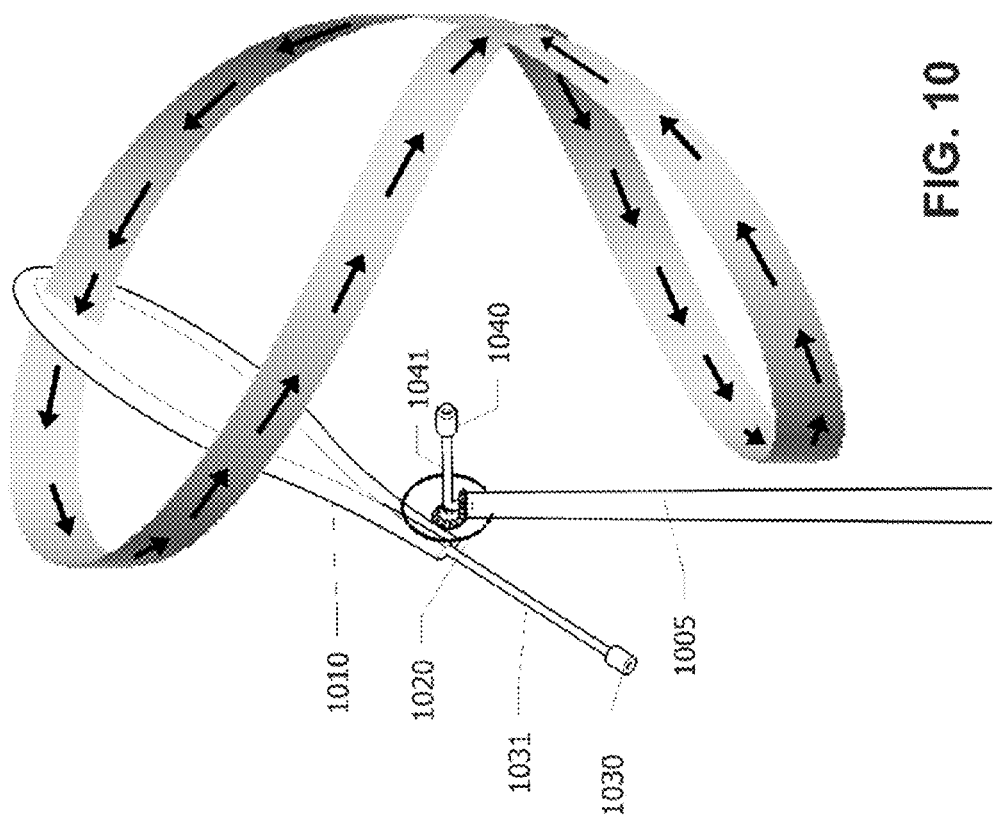
FIG. 10 is a perspective view showing a single blade tip path visualization, according to an embodiment of the present invention.
Figure 11:
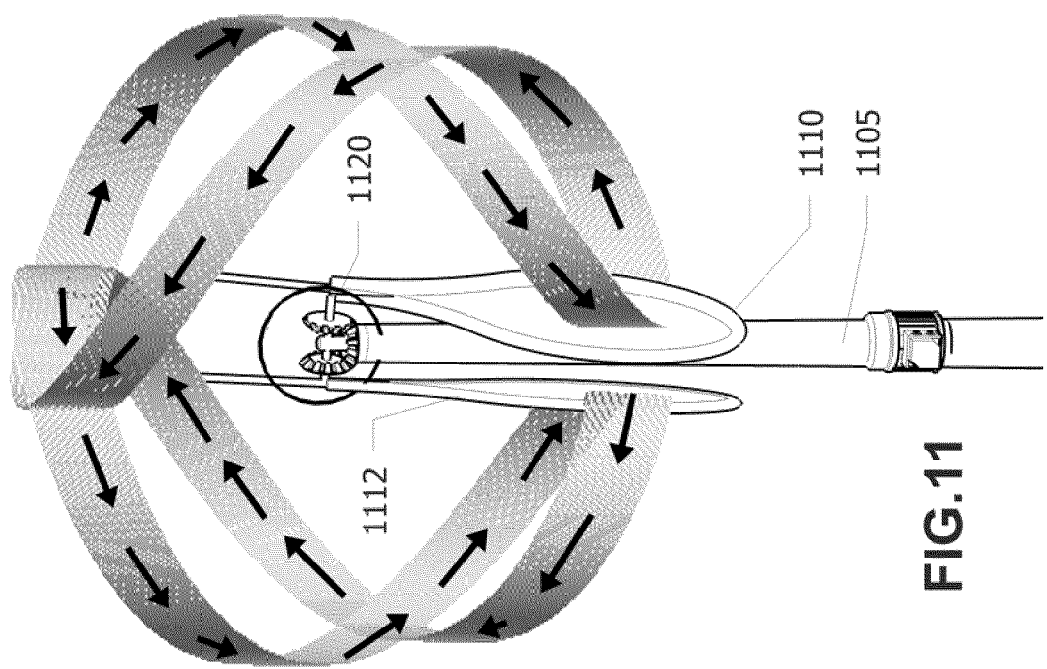
FIG. 11 is a perspective view showing a double blade tip path visualization, according to an embodiment of the present invention.

FIG. 10 shows a perspective view of the blade's 1010 travel path according to an embodiment of the present invention. The path of the blade 1010 is shown as a ribbon that follows the tip's position (the blade 1010 shown in FIG. 10 is just moving upstream, angled parallel to the wind which is coming from the left of the drawing). As can be seen from FIG. 10, the tip of blade 1010 traces out a helical "figure 8" pattern which represents that the blade 1010 is simultaneously rotating about the horizontal axis and vertical axis and the position of the blade 1010 cycles between nearly completely vertical and nearly completely horizontal. Note this single blade 1010 only cycles through the space to the right side of the mast 1005 only. Therefore, a second blade 1112, as seen in FIG. 11, can be added to extract additional energy from the wind stream on the left side of the mast 1105. Note also that neither blade 1110, 1112 passes behind the mast 1105 base in the downwind direction, but to the side, thus reducing buffeting. Such a configuration leaves open an unobstructed location near the gearbox 1120 to attach a wind vane to automatically aim the blades 1110, 1112 into the apparent wind direction (assuming the gearbox 1120 is mounted on a rotatable turret).

Figure 12:
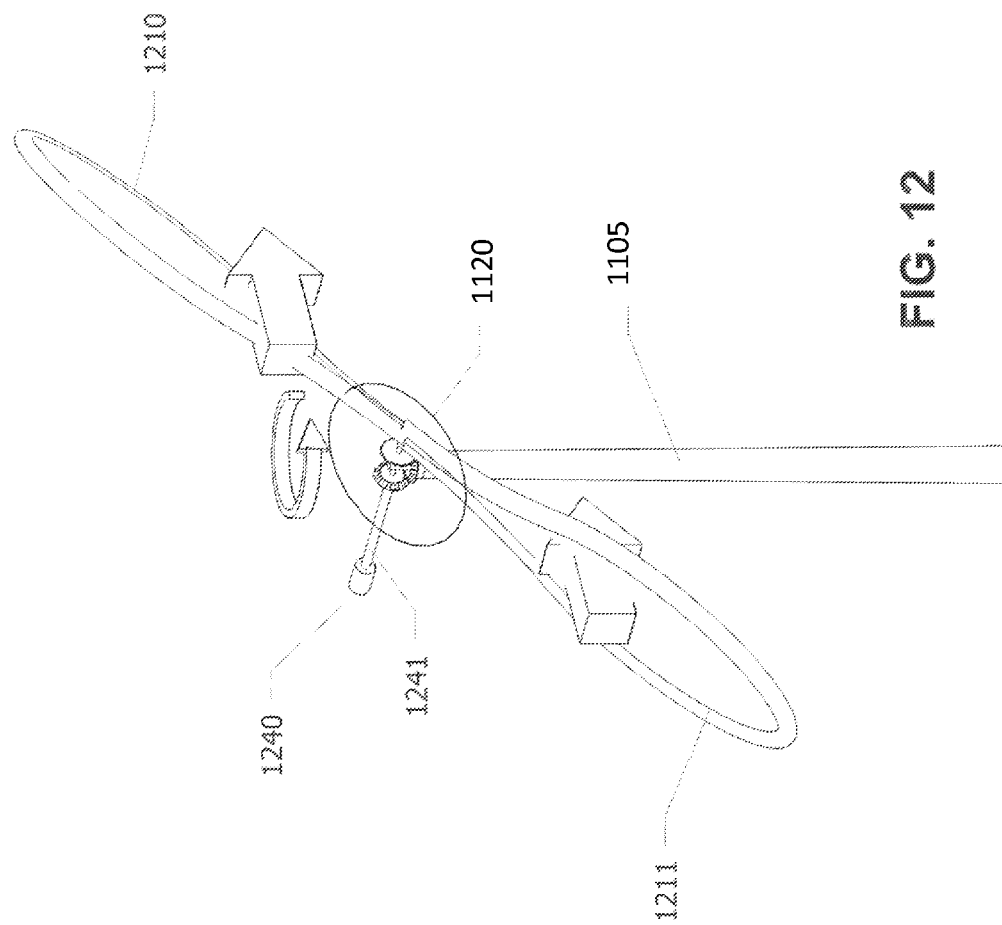
FIG. 12 is a perspective view showing a double-blade arrangement, according to an embodiment of the present invention.

As shown earlier in FIG. 10, a single bladed turbine according to an embodiment of the present invention comprises a simple flat blade 1010 connected with its face attached perpendicularly to its blade axle (not visible in FIG. 10), along with the blade counterbalance 1030 and balance rod 1031. According to an alternate embodiment, and referring to FIG. 12, the blade counterbalance and balance rod can be replaced by a second blade 1211 connected perpendicularly (i.e., offset 90 degrees) to the first blade 1210. When the upper blade 1210 is parallel to the wind and moving upstream with little drag, lower blade 1211 is perpendicular to the wind, gathering energy by capturing the downstream flow. This is one reason the wind turbine according to an embodiment of the present invention starts rotating at lower wind velocities compared to a LVAWT. The double blade arrangement has the advantage of reducing the negative drag effects of the counterbalance 1040 and balance rod 1041 (shown in FIG. 10), which reduce the relative torque between the blade 1010 and the blade counterbalance 1030.

According to an embodiment of the present invention, unlike the blades in a typical LHAWT, both faces of the wind turbine's blade may be exposed to the downstream wind during part of the rotation cycle (see the embossed "F" in FIG. 8 for confirmation). Thus a conventional asymmetric airfoil would be ineffective at providing lift. However, while both blade faces are impacted by the downstream wind, only one edge moves upstream. Thus, a streamlined symmetric wing profile blade 1302 as shown in FIG. 13 reduces unnecessary drag in the upstream part of the cycle.

Figure 13:
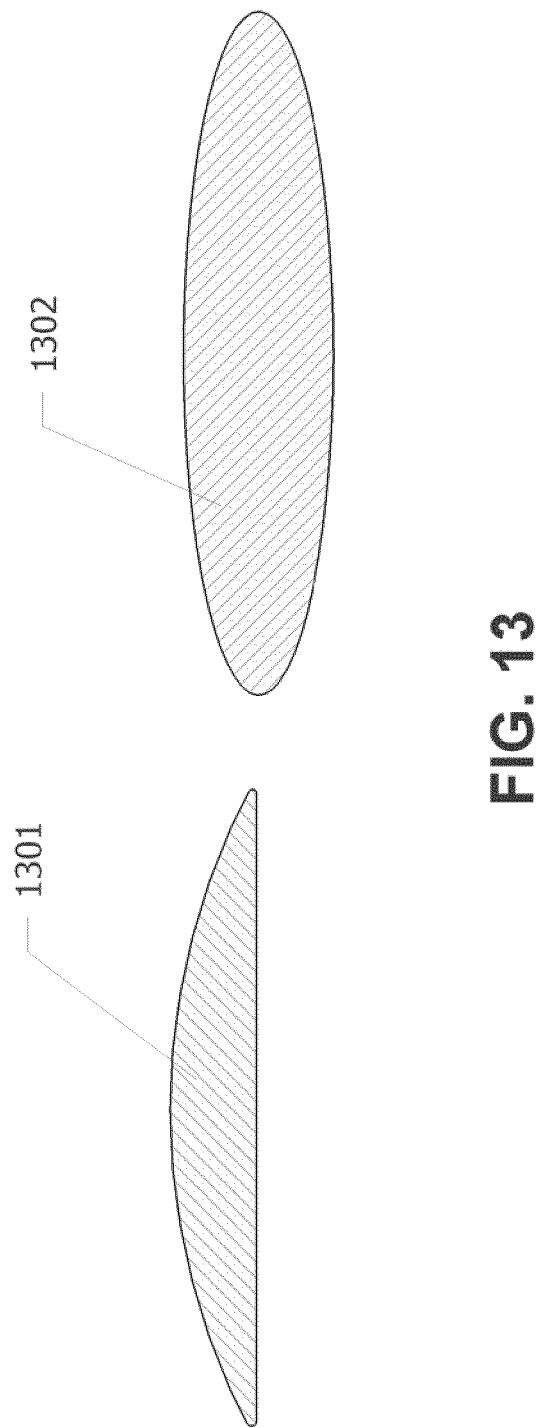
FIG. 13 shows a cross-sectional view of various wing geometries, according to an embodiment of the present invention.
Figure 14:
FIG. 14 is a side view of time-ordered sequence of "snapshots" as the blade moves from left to right in time, according to an embodiment of the present invention.

Referring to FIG. 14, only one face of the blade (but both edges) is exposed to the downstream wind during one cycle (note the letter "F" is never mirror reversed), so a symmetric half-wing cross-section 1301 like that shown in FIG. 13 will provide some aerodynamic lift during the part of the rotation where the blade is horizontal. These more sophisticated blade profiles may result in increased efficiency, but are not required for operation. Even in the absence of these special blade profiles, two double blades (shown as pairs 1510, 1511, and 1512, 1513 in FIG. 15), would most likely be used in a wind turbine according to an embodiment of the present invention. This dual, double-bladed combination is symmetric, thus reducing vibration while intersecting the entire wind stream (left and right of the mast 1505) during a full rotational cycle.

Figure 16:
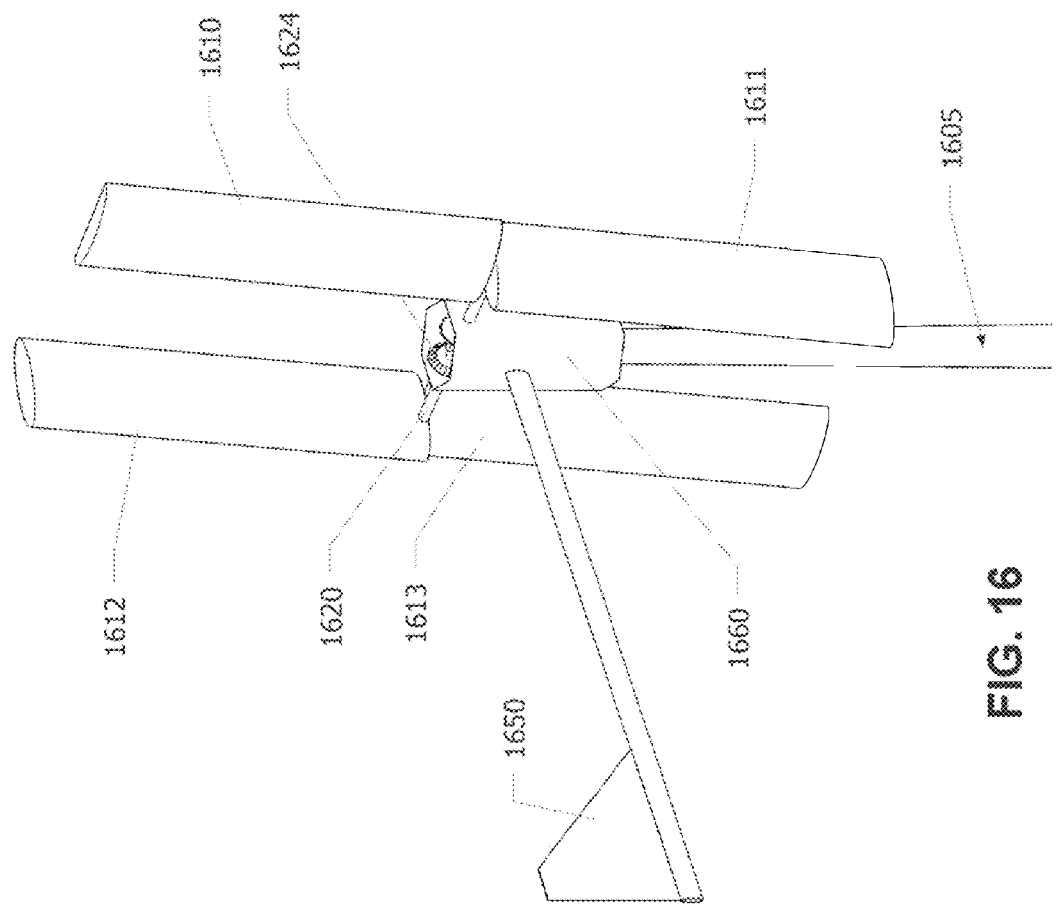
FIG. 16 is a perspective view showing a dual-blade arrangement and wind vane, according to an embodiment of the present invention.

Referring to FIG. 16, a more efficient wind turbine according to an embodiment of the present invention combines two double blades 1610, 1611, and 1612, 1613 with profiles 1301 and 1302 as shown in FIG. 13, along with a vane arm 1650 to orient the blade assembly turret 1660 into the wind. Note the blade axle 1620 of blades 1610, 1611, 1612, 1613 has been extended to provide clearance when the blades 1610, 1611, 1612, 1613 swing by the side of the mast 1605. According to an embodiment of the present invention, wind vanes are suitable in smaller wind turbines (3 meter blade diameter and below). Above that size the vane arm 1650 becomes unwieldy and a system of motors and wind direction sensors may be used to point the blade assembly turret 1660 into the wind.

Figure 15:
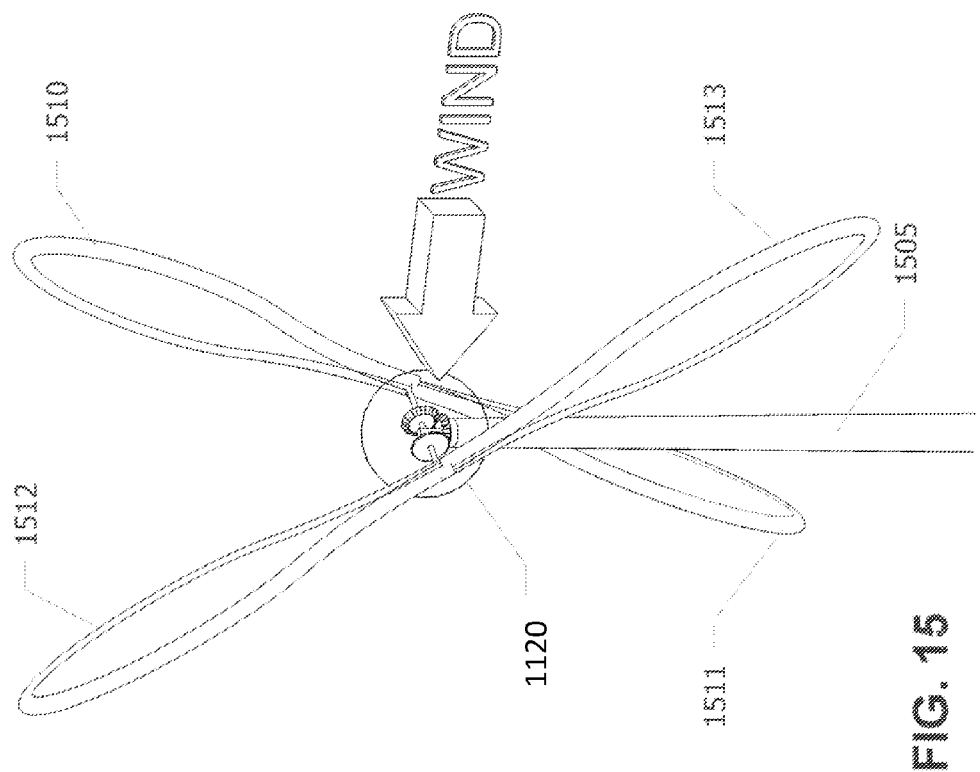
FIG. 15 is a perspective view showing a dual-blade arrangement, according to an embodiment of the present invention.

Note, that while the two, double-bladed arms shown in FIGS. 15 and 16 are substantially symmetric, the forces exerted on blade 1610, 1613 are not the same as on blade 1611, 1612. For maximum vibration reduction, only one blade orientation may be preferred according to an embodiment of the present invention. Also, in many installations, the wind turbine's mast 1605 is a major factor in the capital costs. Because any single blade only sweeps through half a circle, it makes economic sense to connect two sets of identical blades on a common mast 1605, connected to a common gearbox 1624 since this configuration minimizes vibration while maximizing total swept area.

According to an embodiment of the present invention, the wind turbine may be mounted above or near a roofline of a structure such as a building. Typically, wind impinging on the front face of a large skyscraper is forced to move upward and then over the roof top. This "curved" wind stream (illustrated by the sequence of arrow in FIGS. 17A, 17B and 17C) do not couple well to existing HAWTS or VAWTS because these designs are optimized for winds arriving from a single perpendicular direction along the entire turbine swept area. Turbulence in the wind caused by the building itself or other man-made or natural features also contributes to the poor performance of existing wind turbines when used for rooftop applications. However, the blades according to embodiments of the present invention follow a helical figure eight pattern, which more closely matches the wind stream near a roof. FIG. 17A illustrates a two blade wind turbine mounted on the roof of a tall building, with the mast 1705 and gearbox 1720 mounted parallel to the XZ plane.

Note in this portion of the rotation cycle, the wind impinges perpendicular to the blade 1710 and 1712 faces, forcefully causing each blade 1710 and 1712 to rotate. Then, as the blades 1710 and 1712 continue to turn on the drive shaft 1725 (shown in FIG. 17B) and project horizontally beyond the face of the building (FIG. 17B), they continue to remain perpendicular to the wind direction. Finally (as illustrated in FIG. 17C), when above the roof edge, the wind and blades 1710 and 1712 are again aligned, thus improving efficiency in this complex environment. One having ordinary skill in the art will appreciate that further variations and installation scenarios for the wind turbine are possible.

FIG. 18A illustrates a "U" shaped mast 1805 according to an embodiment of the present invention. In this embodiment, the top of the mast 1805 is in a "U" shaped configuration and a generator 1804 can be connected at the intersection of the main mast 1805 and the "U" portion. Each end of the "U" portion of the mast 1805 has its own gearbox 1820 and 1870 respectively to which two independent wing sets (1810, 1812 and 1814, 1816) may be connected. Each gearbox 1820, 1870 has a drive shaft that engages with the generator 1804 to produce electricity. While it is possible to adjust the orientation of blades 1810, 1812 relative to the orientation of blades 1814, 1816 to any arbitrary angle with respect to the other, experiments indicate that the symmetric arrangement of FIG. 18B results in the least vibration and highest efficiency. Indeed, if the left and right drive shafts are disconnected from the generator 1804, blades 1810, 1812, 1814, 1816 quickly synchronize the relative blade orientation into this symmetric arrangement on their own.

Figure 19A:
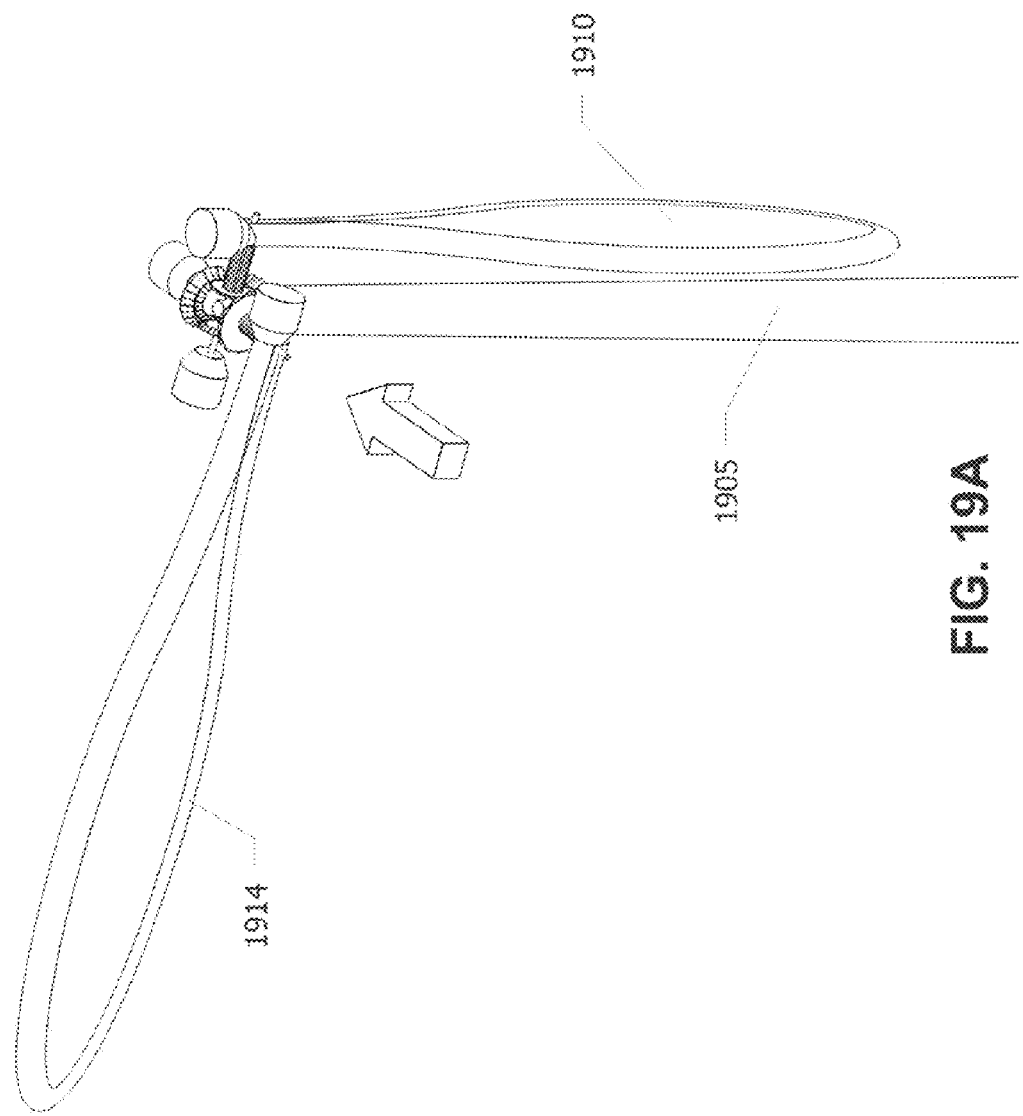
FIG. 19A is a perspective view of a modified gear box configuration, according to an embodiment of the present invention.

In the previous exemplary embodiments, all rotating blade gears are mated to a common mast gear and the resulting four-bladed wind turbine is symmetric around a vertical plane. This arrangement helps to ensure that the vertical rotation is properly synchronized to the horizontal spinning (such that the downstream forces are maximized, while the upstream drag is minimized), and to ensure that the blades do not collide. However, by incorporating a "daughter" set of blade gears, it is possible to connect blades more densely and/or in a different symmetry. According to an embodiment of the present invention and referring to FIG. 19A, one single blade 1910 can be oriented 90 degrees away from a second single blade 1914. At this moment in time, blade 1914 is perpendicular to the wind and moving downstream (the wind direction is represented by the arrow), while blade 1910 is moving upstream but with minimized drag due to presenting a thin blade edge against the wind. According to an embodiment of the present invention, this wind turbine utilizes a modified gear box to accommodate additional blades.

The modified gear box 1980 according to an embodiment of the present invention is shown in FIG. 19B. The modified gear box 1980 allows both blades 1910 and 1914 to rotate in a helical "figure 8" pattern, yet still not collide with one another during the rotational cycle. The mast gear 1981 and blade gears 1982, 1983 are approximately the same diameter and pitch. The blade gears 1982, 1983 are connected to a blade axle 1984 as in previous examples. In addition, the blade axle 1984 is connected to a drive shaft 1985 as in previous examples. However, unlike the gear box described in previous embodiments, the modified gear box 1980 uses a group of four smaller gears 1986, 1987, 1988, 1989 all having approximately the same diameter that reside within the modified gear box 1980, and form a so called "daughter" gear train. Smaller gear 1989 is rigidly connected to larger gear 1982, and is configured to rotate freely on axle 1984. Similarly, smaller gear 1989 is rigidly connected to larger gear 1983. A collar 1990 connects blade 1910 to gear 1983, and this entire assembly rotates freely on blade axle 1984. Smaller gear 1986 transmits power from blade 1910 to the larger gear 1983 and thus into the drive shaft 1985. An identical gear arrangement is positioned across from blade 1914. Gears 1982, 1982 are also responsible for transferring power into the drive shaft 1985.

As in previous embodiments described herein, blades 1910, 1914 intercept the wind essentially on the left half side of the mast 1905, so additional blades are required to intercept a full swept area circle. However, unlike in previous embodiments, blade 1910 will pass behind the mast 1905 during one revolution, thus preventing the attachment of a wind vane near the mast 1905 peak. Such a configuration also exposes blade 1910 to additional mast 1905 induced turbulence.

Figure 20:
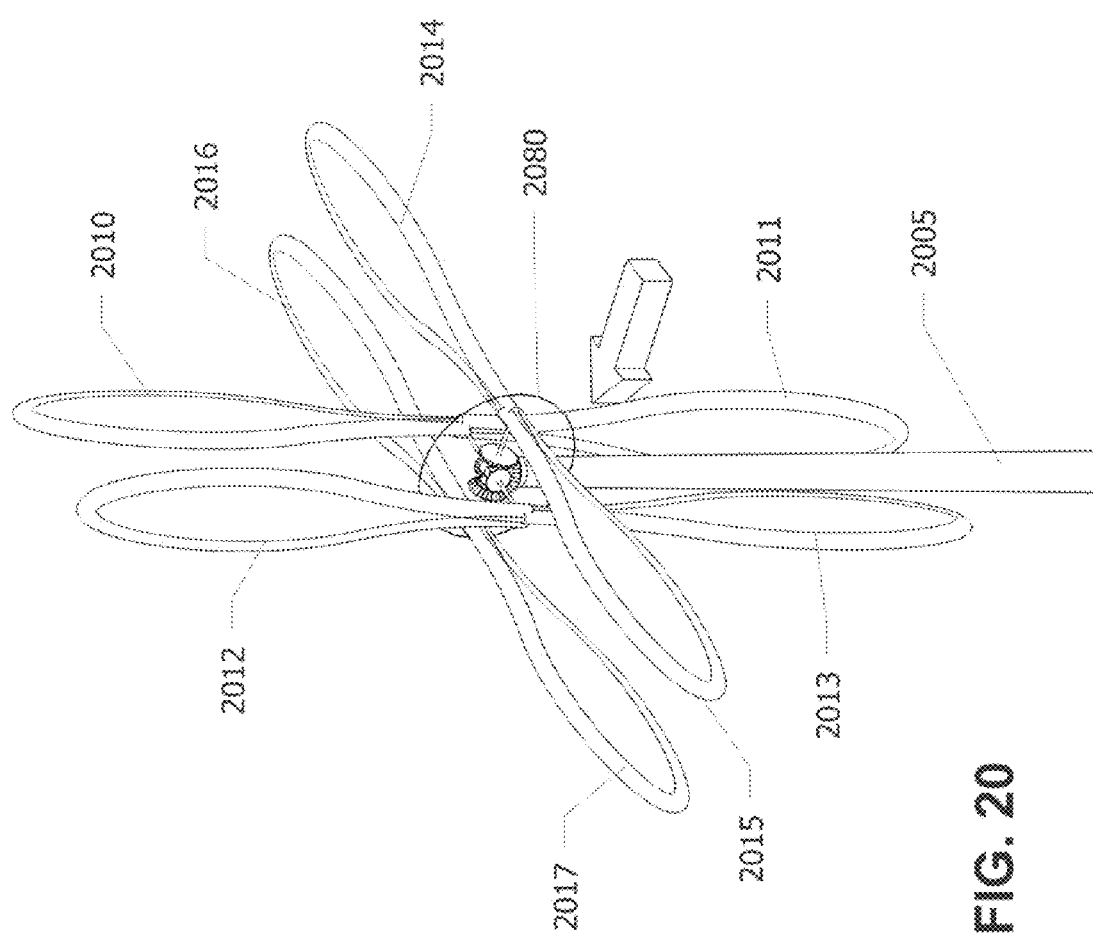
FIG. 20 is a perspective view showing a quad double-blade arrangement, according to an embodiment of the present invention.

According to an embodiment of the present invention, and referring to FIG. 20, the modified gearbox 2080 permits eight blades (four double-blades) to rotate on one mast 2005, with one modified gearbox 2080, without mutual interference while capturing energy from the entire swept area. Each double-blade set features blades that are offset from one another by 90 degrees. In addition, one double blade set is connected 180 degrees apart from another double blade set on opposing ends of each blade axle. As shown in FIG. 20, double blade set 2010, 2011 is connected opposite and parallel to double blade set 2012, 2013. In addition, blade 2010 is perpendicular to blade 2012 and blade 2011 is perpendicular to blade 2013. This blade arrangement is repeated across double blade set 2014, 2015 and 2016, 2017. In this way, four blade faces are oriented perpendicular to the wind direction (denoted by the arrow in FIG. 20) at any given time while the four other blades are oriented parallel to the wind direction.

Figure 21:
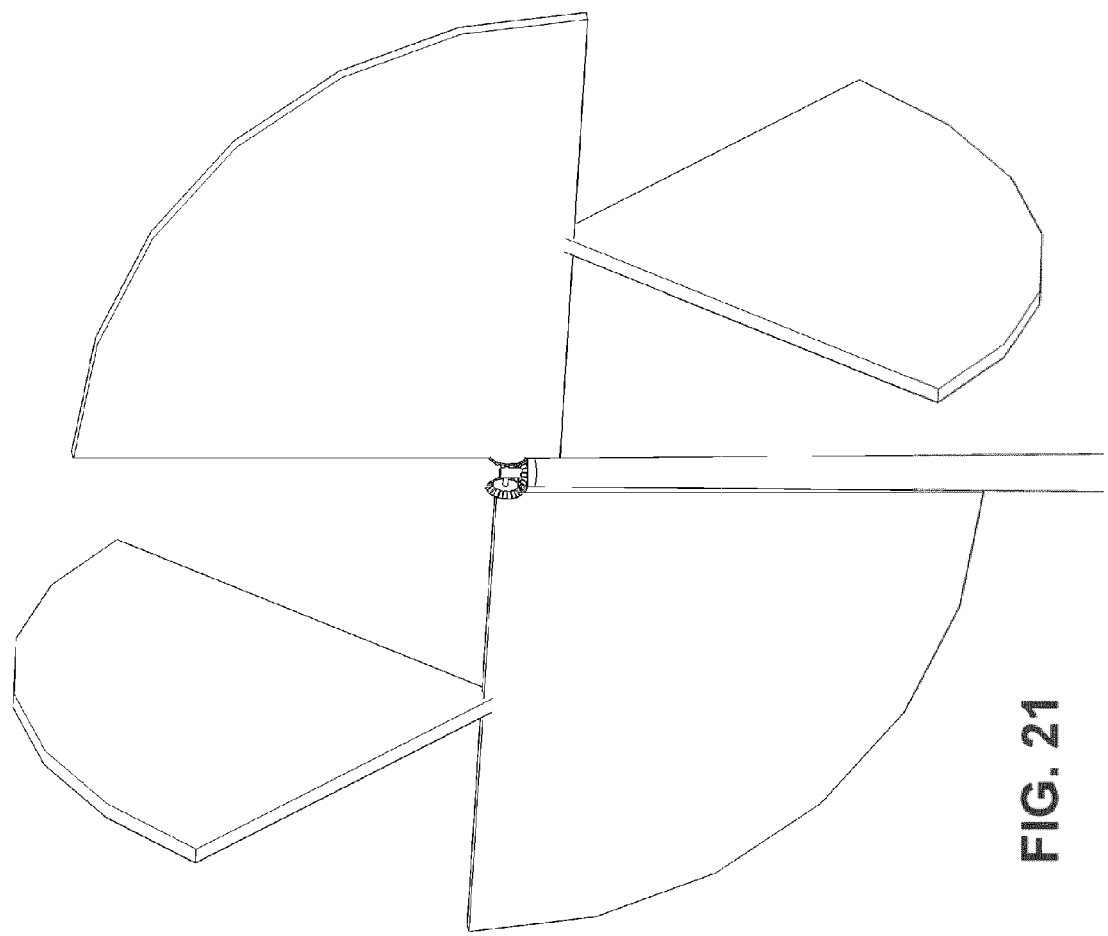
FIG. 21 is a perspective view showing alternate blade shapes, according to an embodiment of the present invention.
Figure 22:
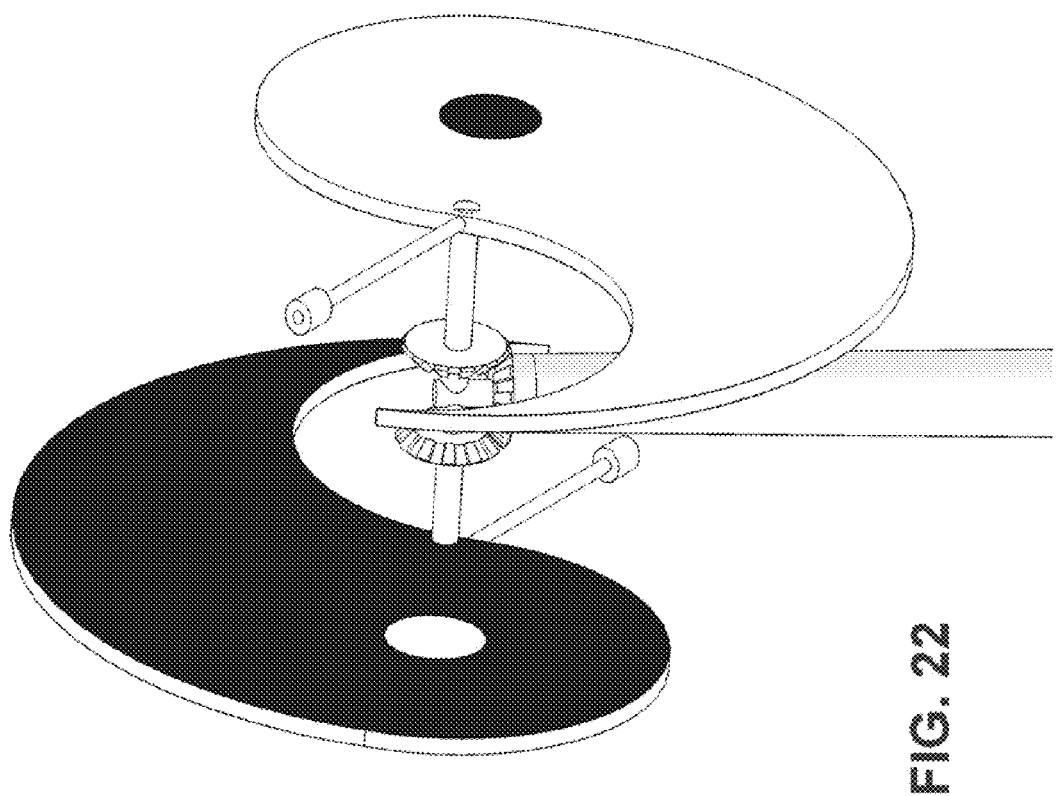
FIG. 22 is a perspective view showing alternate blade shapes, according to an embodiment of the present invention.

One having ordinary skill in the art will appreciate that a wide variety of blade shapes and geometries may be used. According to an embodiment of the present invention, wider blades like the quarter circles shown in FIG. 21 can be deployed to more efficiently engage the wind at very low speeds. This design is particularly beneficial when the drive shaft is engaged to a low speed, high torque mechanism, such as a water pump. In addition, FIG. 22 shows an exemplary yin-yang shape that may be used for decorative purposes, such as in a garden whirligig. Other decorative embodiments such as flying geese or acrobats may also be used when the wind turbine is deployed in decorative applications.

A wind turbine according to an embodiment of the present invention may be constructed with steel gears and lightweight aluminum honeycomb blades. The gearbox 2320 used in this particular embodiment is shown FIG. 23. The mast gear 2321 is connected to the top of the mast 2305. A ring bearing 2391 is connected to the top of the mast 2321. The ring bearing 2391 allows the drive shaft 2325 to rotate as the blades turn. The drive shaft 2325 passes through the mast gear 2321 into the mast 2305. The blade gears 2322, 2323 are attached to the ends of each blade axle 2324. Each blade axle also incorporates an adjustable blade flange 2397 which is used for connecting the blades (not shown in FIG. 23) to the respective blade axle 2324. Bearings 2395, 2396 connected on each blade axle 2324 allow each blade axle 2324 to rotate as the blades are acted on by the wind. A top-mounted spur gear 2394 is engaged to both blade gears 2322 and 2323. An upper cradle 2393 and lower cradle 2392 support the entire gearbox 2320 and also provide protection from the elements.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

What is claimed is:

1. A wind turbine comprising:
   a mast;
   a mast gear connected to an end of the mast
   a blade axle connected to the mast gear; and
   a first turbine blade and a second turbine blade connected to the blade axle, wherein a longitudinal axis of the first turbine blade and the second turbine blade are substantially perpendicular to the blade axle and configured to rotate about a vertical axis of the mast and a horizontal axis of the mast when acted on by an external force.

2. The wind turbine according to claim 1, wherein during one-half of a full cycle around the vertical axis, a surface of the one or more turbine blades is approximately perpendicular to the external force during a quarter of the full cycle, then approximately parallel to the external force during a subsequent quarter of the full cycle.

3. The wind turbine according to claim 1, wherein the mast is oriented substantially perpendicular to a ground plane.

4. The wind turbine according to claim 1, wherein the mast is oriented substantially parallel to a ground plane.

5. The wind turbine according to claim 1, wherein at least one of the first blade and the second blade comprises a dual-blade arrangement.

6. A wind turbine comprising:
   a mast;
   a mast gear connected to an end of the mast;
   a drive shaft configured to rotate about a drive shaft axis;
   at least one blade axle connected to an end of the drive shaft, wherein the blade axle is configured to rotate about a blade axle axis that is perpendicular to the drive shaft axis;
   at least one blade gear connected to an end of the at least one blade axle, wherein the blade gear is configured to engage the mast gear; and
   a first turbine blade and a second turbine blade connected to the at least one blade axle, wherein a longitudinal axis of the first turbine blade and the second turbine blade are substantially perpendicular to the at least one blade axle and configured to rotate about a vertical axis of the mast and a horizontal axis of the mast when acted on by an external force.

7. The wind turbine according to claim 6, wherein the mast is oriented substantially perpendicular to a ground plane.

8. The wind turbine according to claim 6, wherein the mast is oriented substantially parallel to a ground plane.

9. The wind turbine according to claim 6, wherein the mast gear and the at least one blade gear are bevel gears.

10. The wind turbine according to claim 6 further comprising a vane arm.

11. The wind turbine according to claim 6, wherein at least one of the first turbine blade or the second turbine blade is configured to provide aerodynamic lift while rotating.

12. The wind turbine according to claim 6, wherein the drive shaft is configured to pass through the mast gear and extend into a hollow portion of the mast.

13. The wind turbine according to claim 12, wherein an end of the drive shaft is connected to a generator.

14. The wind turbine according to claim 12, wherein an end of the drive shaft is connected to a pump.

15. A wind turbine comprising:
   a mast;
   a mast gear connected to an end of the mast
   a drive shaft connected to the mast gear, wherein the drive shaft is configured to transmit power from the blades via the mast gear to perform work;
   at least one blade axle connected to the mast gear, wherein the blade axle is configured to rotate about a blade axle axis that is perpendicular to a drive shaft axis; and
   a first turbine blade and a second turbine blade connected to the at least one blade axle, wherein a longitudinal axis of the first turbine blade and the second turbine blade are substantially perpendicular to the at least one blade axle, wherein when the at least one of the first turbine blade or the second turbine blade is acted upon by an external force, the at least one of the first turbine blade or the second turbine blade rotates about the blade axle and the drive shaft axis, causing a tip of the at least one of the first turbine blade or the second blade to move in a figure eight path during a rotational cycle.

16. The wind turbine according to claim 15, wherein the mast gear comprises a daughter gear train.

17. The wind turbine according to claim 15, wherein an end of the drive shaft is connected to a generator.

18. The wind turbine according to claim 15, wherein an end of the drive shaft is connected to a pump.

* * * * *